(12) United States Patent
Zhou et al.

(10) Patent No.: US 11,258,547 B2
(45) Date of Patent: Feb. 22, 2022

(54) TECHNIQUES FOR PERFORMING RETRANSMISSION BASED ON A BEAM SWEEP

(71) Applicant: QUALCOMM Incorporated, San Diego, CA (US)

(72) Inventors: Yan Zhou, San Diego, CA (US); Xiaoxia Zhang, San Diego, CA (US); Seyed Ali Akbar Fakoorian, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/890,988

(22) Filed: Jun. 2, 2020

(65) Prior Publication Data

US 2020/0403738 A1    Dec. 24, 2020

Related U.S. Application Data

(60) Provisional application No. 62/865,140, filed on Jun. 21, 2019.

(51) Int. Cl.
*H04B 7/02* (2018.01)
*H04L 1/18* (2006.01)
(Continued)

(52) U.S. Cl.
CPC ......... *H04L 1/1864* (2013.01); *H04B 7/0695* (2013.01); *H04B 7/088* (2013.01)

(58) Field of Classification Search
CPC ..... H04L 1/1864; H04B 7/0695; H04B 7/088; H04W 76/19
(Continued)

(56) References Cited

U.S. PATENT DOCUMENTS

2018/0124830 A1*    5/2018    Lin ................... H04W 74/0833
2019/0053314 A1    2/2019    Zhou et al.
(Continued)

FOREIGN PATENT DOCUMENTS

| WO | WO-2018129300 A1 | 7/2018 |
| WO | WO-2019024110 A1 | 2/2019 |
| WO | WO-2019032882 A1 | 2/2019 |

OTHER PUBLICATIONS

International Search Report and Written Opinion—PCT/US2020/035952—ISA/EPO—dated Sep. 7, 2020.
U.S. Appl. No. 62/865,140, filed Jun. 21, 2019, 99 Pages.

*Primary Examiner* — Don N Vo
(74) *Attorney, Agent, or Firm* — Holland & Hart LLP

(57) ABSTRACT

Methods, systems, and devices for wireless communications are described. A base station and a UE may determine that a first transmission on a first set of beams is unsuccessful. The base station and the UE may perform a beam sweep using a plurality of inactive beams based on the determination. The UE may transmit an indication of a second set of beams to the base station. The second set of beams may be selected by the UE based on the beam sweep. Responsive to the indication, the base station and the UE may communicate a second transmission on the second set of beams based at least in part on the indication. The second transmission may be a retransmission of the first transmission.

30 Claims, 17 Drawing Sheets

(51) Int. Cl.
*H04B 7/06* (2006.01)
*H04B 7/08* (2006.01)

(58) Field of Classification Search
USPC .......................................................... 375/267
See application file for complete search history.

(56) References Cited

U.S. PATENT DOCUMENTS

| | | |
|---|---|---|
| 2019/0075573 A1* | 3/2019 | Kwon .................. H04W 72/046 |
| 2019/0098520 A1* | 3/2019 | Kim ....................... H04W 76/28 |
| 2019/0110281 A1 | 4/2019 | Zhou et al. |
| 2019/0215820 A1 | 7/2019 | Cirik et al. |
| 2020/0014453 A1 | 1/2020 | Takeda et al. |
| 2020/0022067 A1* | 1/2020 | Pan ....................... H04W 48/14 |
| 2020/0205085 A1* | 6/2020 | Li ......................... H04B 7/0682 |

* cited by examiner

TECHNIQUES FOR PERFORMING RETRANSMISSION BASED ON A BEAM SWEEP

CROSS REFERENCE

The present application for patent claims the benefit of U.S. Provisional Patent Application No. 62/865,140 by ZHOU et al., entitled "TECHNIQUES FOR PERFORMING RETRANSMISSION BASED ON A BEAM SWEEP," filed Jun. 21, 2019, assigned to the assignee hereof, and expressly incorporated by reference herein.

FIELD OF DISCLOSURE

The following relates to wireless communications, and more specifically to techniques for performing retransmission based on a beam sweep.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may support a large number of user equipment (UEs). Industrial internet of things (IIoT) applications, for example, may involve very large numbers of UEs. In some cases, however, a connection between a base station and a UE may fail due to blocking or other causes. In such cases, the devices may utilize a number of techniques to reestablish the connection.

SUMMARY

The described techniques relate to methods, systems, devices, and apparatuses that support techniques for performing retransmission based on a beam sweep. For example, the described techniques provide for a base station and a user equipment (UE) to determine that a first transmission on a first set of beams is unsuccessful. The base station and the UE may perform a beam sweep using a plurality of inactive beams based on the determination. The UE may select a second set of beams based on the beam sweep, and may transmit an indication of the second set of beams to the base station. Responsive to the indication, the base station and the UE may communicate a second transmission on the second set of beams based at least in part on the indication. In some examples, the second transmission may be a retransmission of the first transmission.

A method of wireless communications at a UE is described. The method may include determining a first transmission on a first set of beams is unsuccessful, performing a beam sweep using a set of inactive beams based on the determination that the first transmission on the first set of beams is unsuccessful, transmitting, to a base station, an indication of a second set of beams, where the second set of beams is selected at least from the set of inactive beams based on the beam sweep, and communicating a second transmission on the second set of beams based on transmitting the indication, where the second transmission is a retransmission of the first transmission.

An apparatus for wireless communications at a UE is described. The apparatus may include a processor, memory coupled with the processor, and instructions stored in the memory. The instructions may be executable by the processor to cause the apparatus to determine a first transmission on a first set of beams is unsuccessful, perform a beam sweep using a set of inactive beams based on the determination that the first transmission on the first set of beams is unsuccessful, transmit, to a base station, an indication of a second set of beams, where the second set of beams is selected at least from the set of inactive beams based on the beam sweep, and communicate a second transmission on the second set of beams based on transmitting the indication, where the second transmission is a retransmission of the first transmission.

Another apparatus for wireless communications at a UE is described. The apparatus may include means for determining a first transmission on a first set of beams is unsuccessful, performing a beam sweep using a set of inactive beams based on the determination that the first transmission on the first set of beams is unsuccessful, transmitting, to a base station, an indication of a second set of beams, where the second set of beams is selected at least from the set of inactive beams based on the beam sweep, and communicating a second transmission on the second set of beams based on transmitting the indication, where the second transmission is a retransmission of the first transmission.

A non-transitory computer-readable medium storing code for wireless communications at a UE is described. The code may include instructions executable by a processor to determine a first transmission on a first set of beams is unsuccessful, perform a beam sweep using a set of inactive beams based on the determination that the first transmission on the first set of beams is unsuccessful, transmit, to a base station, an indication of a second set of beams, where the second set of beams is selected at least from the set of inactive beams based on the beam sweep, and communicate a second transmission on the second set of beams based on transmitting the indication, where the second transmission is a retransmission of the first transmission.

In some examples of the method, apparatuses, and non-transitory computer-readable medium described herein, the first transmission and the second transmission may be communicated during a data exchange cycle scheduled between the UE and the base station.

In some examples of the method, apparatuses, and non-transitory computer-readable medium described herein, determining the first transmission on the first set of beams may be unsuccessful further may include operations, features, means, or instructions for transmitting a hybrid automatic repeat request (HARQ) feedback response associated with a downlink transmission received from the base station.

In some examples of the method, apparatuses, and non-transitory computer-readable medium described herein, determining the first transmission on the first set of beams may be unsuccessful further may include operations, features, means, or instructions for determining a failure to successfully transmit an uplink data message to the base station.

Some examples of the method, apparatuses, and non-transitory computer-readable medium described herein may further include operations, features, means, or instructions for receiving, from the base station, a configuration of a downlink resource set including a set of reference signals, where each reference signal of the set of reference signals may be transmitted using one of the set of inactive beams; and selecting the second set of beams based on a measurement of each reference signal of the set of reference signals.

In some examples of the method, apparatuses, and non-transitory computer-readable medium described herein, the downlink resource set may be activated responsive to determining the first transmission on the first set of beams may be unsuccessful.

Some examples of the method, apparatuses, and non-transitory computer-readable medium described herein may further include operations, features, means, or instructions for receiving, from the base station, an indication of an uplink resource set allocated for transmitting the indication of the second set of beams.

In some examples of the method, apparatuses, and non-transitory computer-readable medium described herein, the uplink resource set may be activated responsive to determining the first transmission on the first set of beams may be unsuccessful.

Some examples of the method, apparatuses, and non-transitory computer-readable medium described herein may further include operations, features, means, or instructions for transmitting the indication of the second set of beams using uplink resources allocated for the second set of beams.

In some examples of the method, apparatuses, and non-transitory computer-readable medium described herein, communicating the second transmission on the second set of beams further may include operations, features, means, or instructions for receiving the second transmission on a downlink channel using the second set of beams.

In some examples of the method, apparatuses, and non-transitory computer-readable medium described herein, communicating the second transmission on the second set of beams further may include operations, features, means, or instructions for transmitting the retransmission on an uplink channel using the second set of beams.

In some examples of the method, apparatuses, and non-transitory computer-readable medium described herein, the communication of the second transmission may be conducted over a downlink control channel, a downlink shared channel, an uplink control channel, an uplink shared channel, or a combination thereof.

Some examples of the method, apparatuses, and non-transitory computer-readable medium described herein may further include operations, features, means, or instructions for identifying the second set of beams for communication in a next data exchange cycle, and communicating with the base station using the second set of beams in the next data exchange cycle.

Some examples of the method, apparatuses, and non-transitory computer-readable medium described herein may further include operations, features, means, or instructions for receiving, from the base station, a signal activating the beam sweep.

Some examples of the method, apparatuses, and non-transitory computer-readable medium described herein may further include operations, features, means, or instructions for determining a first retransmission of the first transmission using the first set of beams may be unsuccessful, where the first set of beams include a set of active beams, and performing the beam sweep using the set of inactive beams based on determining the retransmission may be unsuccessful.

In some examples of the method, apparatuses, and non-transitory computer-readable medium described herein, determining the first retransmission may be unsuccessful further may include operations, features, means, or instructions for performing a first beam sweep using the set of active beams prior to performing the beam sweep using the set of inactive beams, and determining a failure to identify an active beam of the set of active beams based on performing the first beam sweep.

Some examples of the method, apparatuses, and non-transitory computer-readable medium described herein may further include operations, features, means, or instructions for receiving a configuration of the first set of beams prior to determining the first transmission on the first set of beams may be unsuccessful.

A method of wireless communications at a base station is described. The method may include determining a first transmission on a first set of beams is unsuccessful, performing a beam sweep using a set of inactive beams based on the determination that the first transmission on the first set of beams is unsuccessful, receiving, from the UE, an indication of a second set of beams, where the second set of beams is selected at least from the set of inactive beams based on the beam sweep, and communicating a second transmission on the second set of beams based on receiving the indication, where the second transmission is a retransmission of the first transmission.

An apparatus for wireless communications at a base station is described. The apparatus may include a processor, memory coupled with the processor, and instructions stored in the memory. The instructions may be executable by the processor to cause the apparatus to determine a first transmission on a first set of beams is unsuccessful, perform a beam sweep using a set of inactive beams based on the determination that the first transmission on the first set of beams is unsuccessful, receive, from the UE, an indication of a second set of beams, where the second set of beams is selected at least from the set of inactive beams based on the beam sweep, and communicate a second transmission on the second set of beams based on receiving the indication, where the second transmission is a retransmission of the first transmission.

Another apparatus for wireless communications at a base station is described. The apparatus may include means for determining a first transmission on a first set of beams is unsuccessful, performing a beam sweep using a set of inactive beams based on the determination that the first transmission on the first set of beams is unsuccessful, receiving, from the UE, an indication of a second set of beams, where the second set of beams is selected at least from the set of inactive beams based on the beam sweep, and communicating a second transmission on the second set of beams based on receiving the indication, where the second transmission is a retransmission of the first transmission.

A non-transitory computer-readable medium storing code for wireless communications at a base station is described. The code may include instructions executable by a processor to determine a first transmission on a first set of beams is unsuccessful, perform a beam sweep using a set of inactive beams based on the determination that the first transmission on the first set of beams is unsuccessful, receive, from the UE, an indication of a second set of beams, where the second set of beams is selected at least from the set of inactive beams based on the beam sweep, and communicate a second transmission on the second set of beams based on receiving the indication, where the second transmission is a retransmission of the first transmission.

Some examples of the method, apparatuses, and non-transitory computer-readable medium described herein may further include operations, features, means, or instructions for transmitting, to the UE, a configuration of a downlink resource set including a set of reference signals, where each reference signal of the set of reference signals may be transmitted using one of the set of inactive beams; and selecting the second set of beams based on a measurement of each reference signal of the set of reference signals.

In some examples of the method, apparatuses, and non-transitory computer-readable medium described herein, the downlink resource set may be activated responsive to determining the first transmission on the first set of beams may be unsuccessful.

Some examples of the method, apparatuses, and non-transitory computer-readable medium described herein may further include operations, features, means, or instructions for transmitting, to the UE, an indication of an uplink resource set allocated for receiving the indication of the second set of beams.

In some examples of the method, apparatuses, and non-transitory computer-readable medium described herein, the uplink resource set may be activated responsive to determining the first transmission on the first set of beams may be unsuccessful.

In some examples of the method, apparatuses, and non-transitory computer-readable medium described herein, the first transmission and the second transmission may be communicated during a data exchange cycle scheduled between the UE and the base station.

In some examples of the method, apparatuses, and non-transitory computer-readable medium described herein, determining the first transmission on the first set of beams may be unsuccessful further may include operations, features, means, or instructions for receiving a HARQ feedback response associated with a downlink transmission transmitted to the UE.

In some examples of the method, apparatuses, and non-transitory computer-readable medium described herein, determining the first transmission on the first set of beams may be unsuccessful further may include operations, features, means, or instructions for determining a failure to successfully receive an uplink data message from the UE.

Some examples of the method, apparatuses, and non-transitory computer-readable medium described herein may further include operations, features, means, or instructions for receiving the indication of the second set of beams using uplink resources allocated for the second set of beams.

In some examples of the method, apparatuses, and non-transitory computer-readable medium described herein, communicating the second transmission on the second set of beams further may include operations, features, means, or instructions for transmitting the retransmission on a downlink channel using the second set of beams.

In some examples of the method, apparatuses, and non-transitory computer-readable medium described herein, communicating the second transmission on the second set of beams further may include operations, features, means, or instructions for receiving the retransmission on an uplink channel using the second set of beams.

In some examples of the method, apparatuses, and non-transitory computer-readable medium described herein, the communication of the second transmission may be conducted over a downlink control channel, a downlink shared channel, an uplink control channel, an uplink shared channel, or a combination thereof.

Some examples of the method, apparatuses, and non-transitory computer-readable medium described herein may further include operations, features, means, or instructions for identifying the second set of beams for communication in a next data exchange cycle, and communicating with the UE using the second set of beams in the next data exchange cycle.

Some examples of the method, apparatuses, and non-transitory computer-readable medium described herein may further include operations, features, means, or instructions for transmitting, to the UE, a signal activating the beam sweep.

Some examples of the method, apparatuses, and non-transitory computer-readable medium described herein may further include operations, features, means, or instructions for determining a first retransmission of the first transmission using the first set of beams may be unsuccessful, where the first set of beams include a set of active beams, and performing the beam sweep using the set of inactive beams based on determining the first retransmission.

In some examples of the method, apparatuses, and non-transitory computer-readable medium described herein, determining the first retransmission of the first transmission may be unsuccessful further may include operations, features, means, or instructions for performing a first beam sweep using the set of active beams prior to performing the beam sweep using the set of inactive beams, and determining a failure to identify an active beam of the set of active beams based on performing the first beam sweep.

Some examples of the method, apparatuses, and non-transitory computer-readable medium described herein may further include operations, features, means, or instructions for transmitting a configuration of the first set of beams prior to determining the first transmission on the first set of beams may be unsuccessful.

DETAILED DESCRIPTION

A wireless communications system may support a large number of user equipment (UEs). Industrial internet of things (IIoT) applications, for example, may involve communications between very large numbers of UEs or other devices in a network. In such applications, base stations and/or UEs may utilize beamforming techniques to improve signal quality and reliability. Further, in IIoT applications, the base stations and UEs may communicate according to a data exchange cycle, in which the devices may exchange downlink and uplink data (e.g., an initial transmission phase of the cycle), and various resources of the cycle may be allocated for transmission or retransmission (e.g., a retransmission phase). In some cases the UEs may be implemented as sensors, and the base station may send instructions to the UEs in the initial transmission phase. In one example, the UEs are implemented as sensors in a robotic system. In this example, the base station may transmit movement instructions to the UE during the initial transmission phase, and the UE may respond with a transmission indicating the current position of the UE.

Due to resource limitations of the UEs in such applications, the UEs may store or monitor a limited set of active beams that may be used by the base station to communicate with the UEs. In some cases, transmission via one or more of the active beams may be unsuccessful (e.g., fails). The UE and the base station may attempt to retransmit the transmission via the active beams to maintain the connection (e.g., an active beam sweep). However, in some cases, retransmission via the active beam fails (e.g., due to blocking). The techniques described herein provide for allocation of resources in a transmission cycle for a beam sweep of a plurality of inactive beams. In some cases, the UE and the base station may perform a beam sweep including the plurality of inactive beams and a set of active beams. According to the beam sweep, a set of beams may be identified for retransmission, and the UE and the base station may communicate based on the identified set of beams. In some cases, resources for the beam sweep are activated when the transmission and/or retransmission fails.

Aspects of the disclosure are initially described in the context of a wireless communications system. Aspects of the disclosure are further described with respect to a wireless communications system, transmission flows, and a process flow diagram. Aspects of the disclosure are further illustrated by and described with reference to apparatus diagrams, system diagrams, and flowcharts that relate to techniques for performing retransmission based on a beam sweep.

Figure 1:
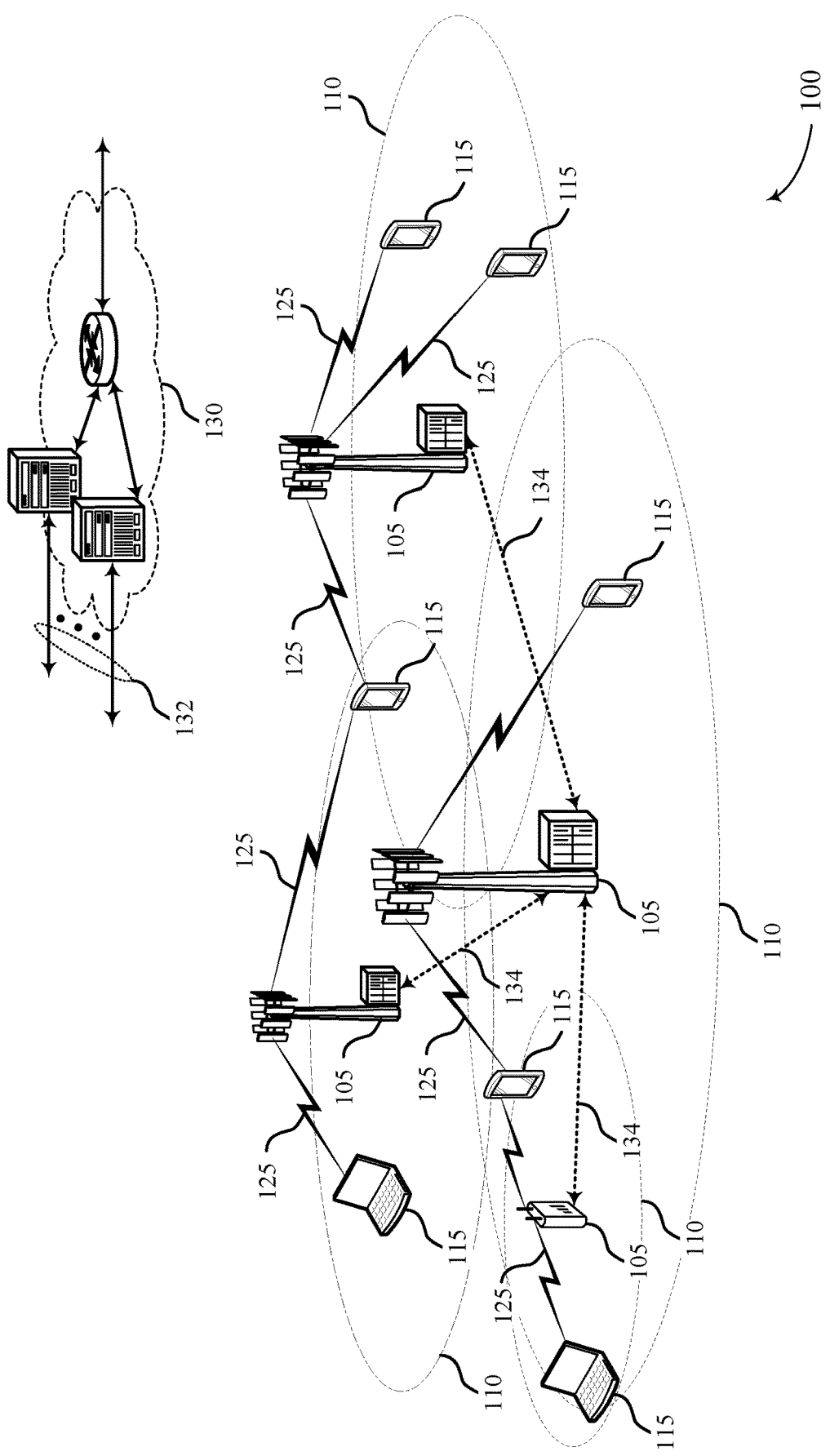
FIG. 1 illustrates an example of a system for wireless communications that supports techniques for performing retransmission based on a beam sweep in accordance with aspects of the present disclosure.

FIG. 1 illustrates an example of a wireless communications system 100 that supports techniques for performing retransmission based on a beam sweep in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support base station 105 that communicates with one or more UEs 115 using beamformed signals. In some cases, the UE 115 stores and/or monitors a set of active beams for communication with the base station. The set of active beams may be configured by the base station 105 using a signaling procedure, based on prior established connection (e.g., via a random access procedure), etc. During an initial transmission phase of a transmission cycle (e.g., a data exchange cycle) between base station 105 and UE 115, the base station 105 and the UE 115 may exchange transmissions using one or more of the set of active beams. In some cases, these transmissions may fail to due to signal blocking or other causes. In the case of transmission failure, the base station 105 and the UE 115 may communicate the transmission using an active beam sweep (e.g., using each of the set of active beams). However, the number of active beams may be limited (e.g., based on constraints of the UE 115) and the transmission exchange during the active beam sweep phase may fail if the active beams fail.

In some wireless communications systems, if the active beam sweep fails, the UE 115 may identify random access resources (e.g., a random access channel (RACH)) allocated by the base station 105 to reestablish the connection with the base station 105. When reestablishing the connection with the base station 105, the base station 105 and the UE 115 may perform a beam sweep (e.g., previously active beams and inactive beams) to identify a number of beams to use, and exchange a new transmission using the identified beams. However, because the UE 115 may wait for random access resources to establish a new connection, latency may be introduced into the system. This may result in reduced reliability, increased power consumption, and communication inefficiencies.

To reduce latency and increase reliability, the implementations described herein provide for performing a retransmission based on a beam sweep (e.g., inactive beam sweep). According to the described techniques, when an initial transmission and/or a retransmission during a data exchange cycle is unsuccessful, the base station 105 and the UE 115 may perform a beam sweep using a plurality of inactive beams (e.g., beams with unknown characteristics or measurements by the UE 115) using resources of the transmission cycle. The transmission failure may be identified based on a feedback response (e.g., a negative acknowledgement (NACK)) associated with a downlink transmission received from the base station 105 or based on a failure to successfully transmit an uplink data message to the base station 105. Based on the beam sweep, the UE 115 may identify one or more satisfactory beams (e.g., based on reference signal measurements) and transmit an indication of the identified satisfactory beams to the base station 105. The base station 105 and the UE 115 may retransmit the failed transmission using the identified beams. Accordingly, rather than waiting for random access resources to establish a new connection with the base station 105, the UE 115 and the base station 105 may efficiently identify one or more beams to use in the current transmission cycle. Thus, latencies caused by establishing a new connection may be avoided, and system reliability and communication may be improved while reducing power consumption.

The base station 105 may transmit a configuration of a downlink resource set including a set of reference signals for the UE 115 to utilize in the beam sweep. Each reference signal may be transmitted using one of the inactive beams. The base station 105 may also transmit a configuration of an uplink resource set for selecting a beam responsive to the beam sweep. In some cases, the resources used for the beam sweep and selecting a beam may be activated after a transmission failure. Thus, if no transmission failure occurs, the resources (e.g., downlink and uplink) may be used for other communication purposes. In some examples, beams identified during the beam sweep may be utilized for one or more subsequent transmission cycles. For example, based on successful transmission in a current transmission cycle using an identified beam, the base station 105 may configure the UE 115 to utilize the identified beam in the next transmission cycle.

Figure 2A:
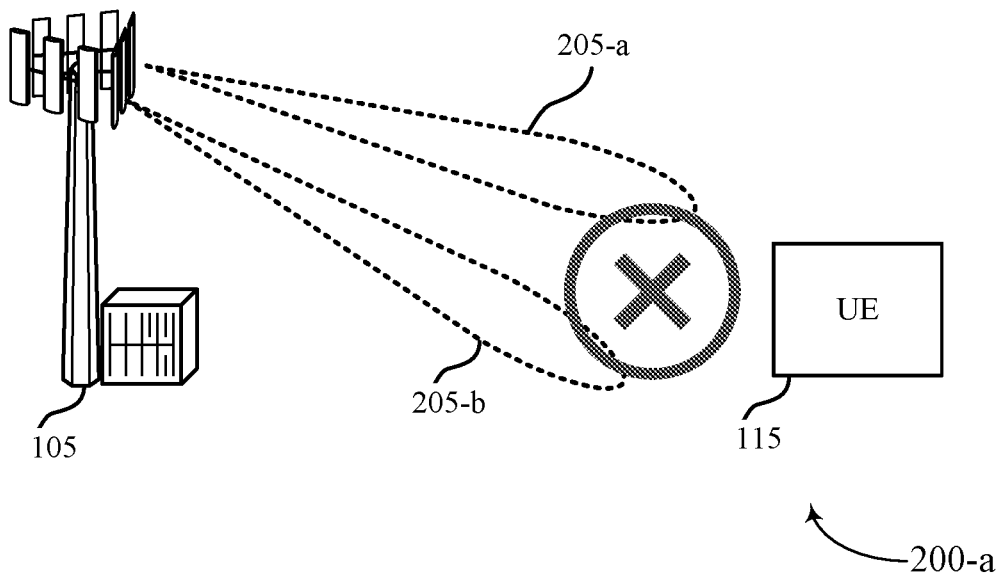
FIGS. 2A and 2B illustrate examples of wireless communications systems that support techniques for performing retransmission based on a beam sweep in accordance with aspects of the present disclosure
Figure 2B:
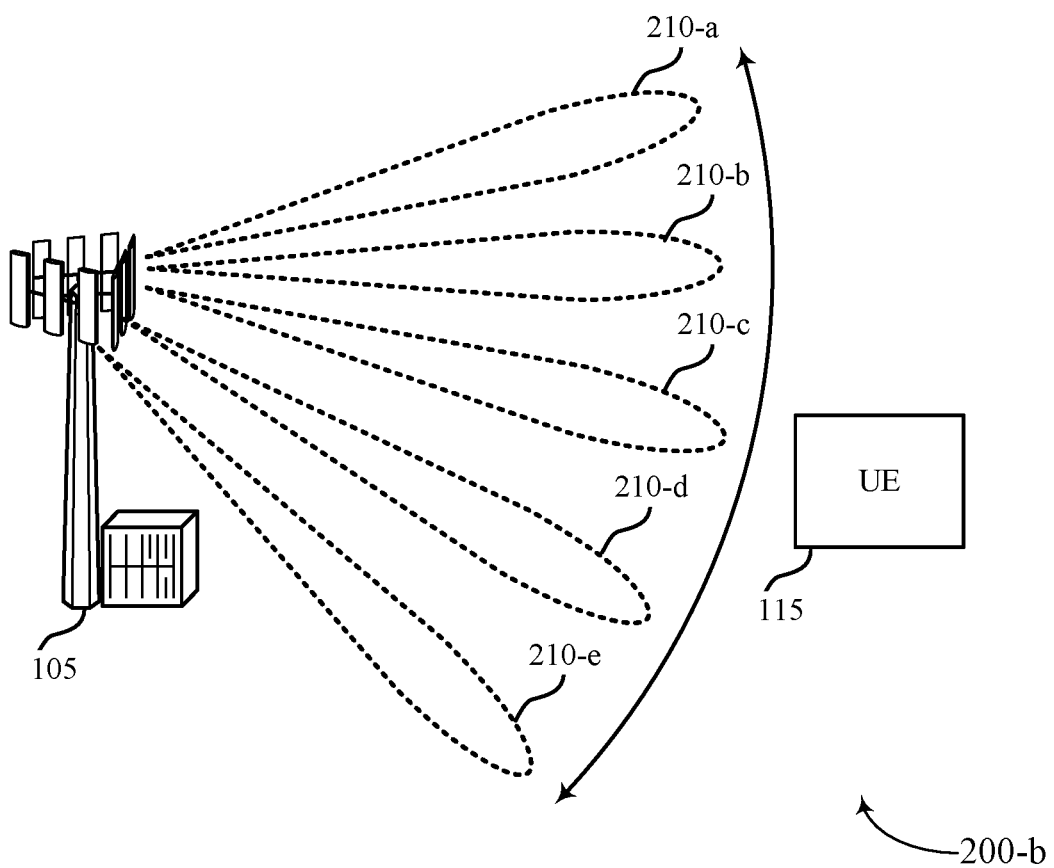

FIGS. 2A and 2B illustrate examples of wireless communications systems 200 that support techniques for performing retransmission based on a beam sweep in accordance with aspects of the present disclosure. In some examples, wireless communications system 200 may implement aspects of wireless communications system 100. The wireless communications system 200 include base station 105 and UE 115. The wireless communications system 200 may support wireless communication via beamformed signals represented by active beams 205 and beams 210. For example, the UE 115 may receive downlink transmissions from the base station 105 via one or more active beams 205 and beams 210, and the base station 105 may receive uplink transmissions via the one or more active beams 205 and beams 210. In some examples, the uplink and downlink transmissions may be communicated according to a scheduled transmission cycle between the base station 105 and the UE 115.

In wireless communications system 200-a of FIG. 2A, the base station 105 may transmit data to the UE 115 using active beam 205-a. However, the transmission may be unsuccessful (e.g., fails) due to one or more conditions. In some cases, the beamformed signal may be blocked by a physical object. The base station 105 and the UE 115 may determine that the transmission failed based on the UE 115 transmitting a non-acknowledgement (NACK) feedback response (e.g., hybrid automatic repeat request (HARQ) feedback, HARQ-ACK) to the base station. In an example, the NACK feedback indicates that the UE 115 was unable to successfully decode the transmission. In other cases, the base station 105 and the UE 115 may determine that an uplink transmission is unsuccessful. For example, the base station 105 and the UE 115 may determine that the UE 115 is unable to successfully transmit an uplink data message to the base station 105. These example transmission failures may occur during an initial transmission phase of a scheduled transmission cycle.

In order to successfully communicate the initial transmission, the base station 105 and the UE 115 may perform an active beam sweep of a set of active beams 205-a. The set of active beams 205-a may include one or more beams configured by the base station 105 for the UE 115. The UE 115 may store and monitor various characteristics associated with the active beams. For example, the UE 115 may actively measure reference signals transmitted via the active beams 205-a, store phase and/or directional information associated with the active beams 205-a, etc. However, the number of active beams may be limited based on resources associated with the UE 115. For example, the UE 115 may be a sensor in an IIoT system and may not include resources for tracking a large number of beams. According to the active beam sweep, the UE 115 and the base station 105 may attempt retransmission of the initial transmission that was unsuccessful. In some cases, the UE 115 and the base station 105 may identify and utilize one of the active beams for transmission during the transmission cycle using the active beam sweep. However, in other cases, the base station 105 and the UE 115 may be unable to perform a transmission exchange using active beams identified in the active beam sweep. In some examples, this failure may be due to physical blocking. In FIG. 2A, the base station 105 and the UE 115 may be unable to exchange transmissions based on the active beams 205 identified from the active beam sweep.

In response to the failed transmission using the active beams 205, the base station 105 and the UE 115 may perform a beam sweep using beam 210-a, beam 210-b, beam 210-c, and beam 210-e, which may correspond to a plurality of inactive beams, as illustrated in wireless communications system 200-b of FIG. 2B. In some cases, the base station 105 and the UE 115 perform a beam sweep including the plurality of inactive beams and a set of active beams (e.g., active beam 205-a and active beam 205-b). In some cases, the base station 105 may preconfigure a set of downlink resources for the plurality of inactive beams for the beam sweep procedure. These downlink resources may be activated based on an initial transmission failure (or retransmission failure). For example, to conserve resources, downlink and uplink beam sweep resources may be dynamically activated based on previous transmission results. For example, the beam sweep resources may be activated if a data exchange fails for an initial transmission and retransmission in the data exchange cycle before a designated beam sweep resource starting time. The activation may be explicitly signaled by the base station 105, or the activation may be implied if a downlink feedback response (e.g., HARQ-ACK) or uplink data is not transmitted by the UE 115 and/or received by the base station 105.

During the beam sweep using the plurality of inactive beams, the base station 105 may transmit a reference signal of a set of reference signals using each of the beams 210 and according to the resources allocated for the beam sweep. In some cases, the reference signals may include channel state information reference signals (CSI-RS). The UE 115 may conduct measurements of each of the reference signals, and select a set of beams based on the measurements. An indication of the selected beams may be communicated to the base station 105. For example, the indication of the selected beams may be communicated by the station by various ways (e.g., explicitly or implicitly). For example, the UE 115 may send an indication via a beam phase recovery request (BFRQ) to the base station 105. In another example, the UE 115 may provide the indication using the selected set of beams to indicate the selected set of beams are to be used for communication between the base station 105 and the UE 115. In another example, the UE 115 may indicate the selected set of beams via resources associated with the beams. For example, the base station 105 may preconfigure uplink resources for indicating the selected beam responsive to the beam sweep. These resources may be activated in response to the initial transmission failure (or retransmission failure). For example, each uplink resource corresponding to a beam may be a 1-symbol physical uplink control channel (PUCCH) (e.g., format 0 or 2). Thus, to indicate a set of beams, the UE 115 may utilize the uplink resource corresponding to the selected beam. Further, the base station 105 may differentiate various UEs 115 using cyclic shifts or frequency allocations. Thus, the base station 105 may identify the UE 115 and the beam based on the utilized resources.

Various channels may be communicated during the data exchange cycle using the selected set of beams. For example, one or more of a physical downlink control channel (PDCCH), a physical downlink shared channel (PDSCH), a PUCCH, and a physical uplink shared channel (PUSCH) may be communicated using the selected set of beams. Moreover, the selected set of beams may be designated as the default beams for PDSCH. In some examples, the selected beams may be utilized in subsequent transmission cycle(s). For example, after a successful communication on the selected set of beams in the current transmission cycle, the base station 105 may configure the UE 115 for utilization of the selected set of beams during a subsequent transmission cycle. The UE 115 and the base station 105 may consider a length of time allocated to a data exchange cycle. For example, if a data exchange cycle is long enough (e.g., greater than 2 ms), the beam sweep resources may be configured in later slots per cycle to identify the set of beams when the prior transmission fails with the active beam sweep (e.g., a beam sweep of active beams 205).

Figure 3:
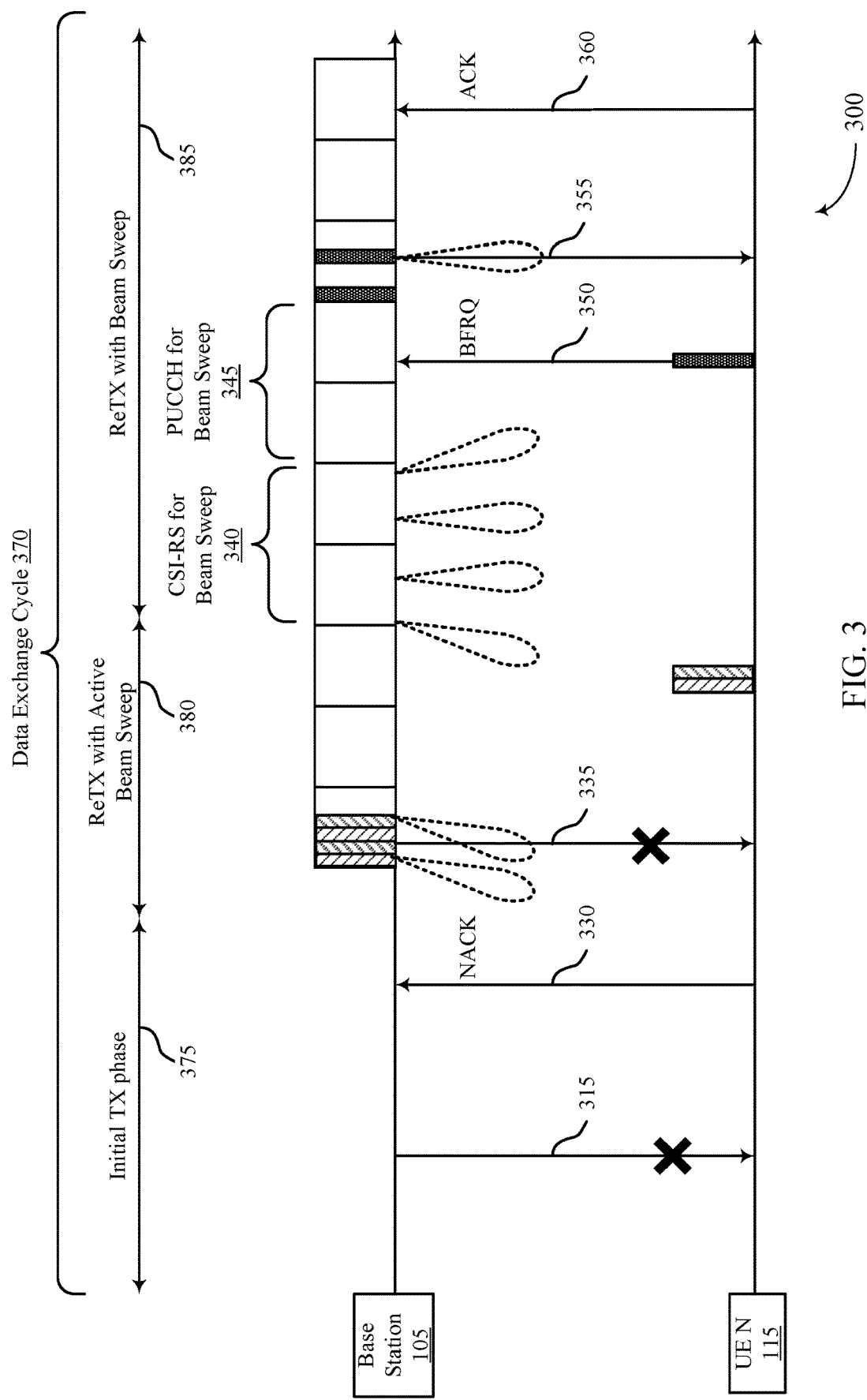
FIG. 3 illustrates an example of a transmission flow that supports techniques for performing retransmission based on a beam sweep in accordance with aspects of the present disclosure.

FIG. 3 illustrates an example of a transmission flow 300 that supports techniques for performing retransmission based on a beam sweep in accordance with aspects of the present disclosure. In some examples, transmission flow 300 may be implemented by aspects of wireless communications system 100. The transmission flow 300 includes a base station 105 and a UE N 115. The transmission flow 300 illustrates communications between base station 105 and UE N 115 during a data exchange cycle 370. During an initial transmission phase 375 of the data exchange cycle 370, the base station 105 may transmit, on resources of allocated for the UE N 115 (e.g., a PDSCH resource allocated for the UE N 115) and using one or more beams, a downlink transmission 315 to the UE N 115. The UE N 115 may transmit a HARQ-ACK (e.g., NACK) response 330 on uplink resources (e.g., a PUSCH resource). The response 330 may indicate that the UE N 115 was unable to successfully decode the downlink transmission 315. In some cases, the downlink transmission 315 may be unsuccessful due to blocking.

In a retransmission phase 380, the base station 105 and the UE N 115 may perform an active beam sweep to identify a set of active beams. Using the set of active beams, the base station 105 may attempt to retransmit the downlink transmission 315 as the transmission 335 using active beams identified in the active beam sweep. The active beam sweep may utilize a set of active beams that are tracked or configured for the UE N 115.

If the downlink transmission 315 (e.g., the initial transmission) is unsuccessful and/or the transmission 335 (e.g., retransmission of the initial transmission) using the active beam sweep is unsuccessful, then preconfigured resources for a beam sweep (e.g., using at least a plurality of inactive beams) may be activated for a retransmission phase 385 including a beam sweep of the data exchange cycle 370. As illustrated in FIG. 3, the base station 105 may configure two or more downlink slots for transmission of reference signals (e.g., CSI-RS) on downlink resources activated for the beam sweep for the plurality of inactive beams. For example, the downlink resources 340 may be allocated for a respective inactive beam, and a CSI-RS may be transmitted on each inactive beam. In some examples, each reference signal may be allocated to one symbol. The UE N 115 may monitor the downlink resources 340 (e.g., preconfigured downlink resources), measure the reference signal on the downlink resources 340, and select one or more corresponding inactive beams based on the measurements. In a PUCCH 345 (or other uplink channel), the UE N 115 may transmit an indication 350 of the selected beam. For example, various uplink resources (e.g., PUCCH 345) may be allocated for each beam, and the indication 350 may be transmitted on the resources allocated for the selected beam. In some cases, the indication 350 may be referred to a beam phase recovery request (BFRQ).

After the set of beams (which may include one or more beams) is selected based on the beam sweep, and after the selected set of beams is indicated via indication 350, the base station 105 may transmit a downlink transmission 355 using the selected set of beams. In some cases, the downlink transmission 355 is a retransmission of the downlink transmission 315 (e.g., the initial downlink transmission). The UE N 115 may transmit a HARQ-ACK response at 360. Based on the response at 360, the base station 105 may configure the UE N 115 for transmission using the selected beam in a next data exchange cycle.

Figure 4:
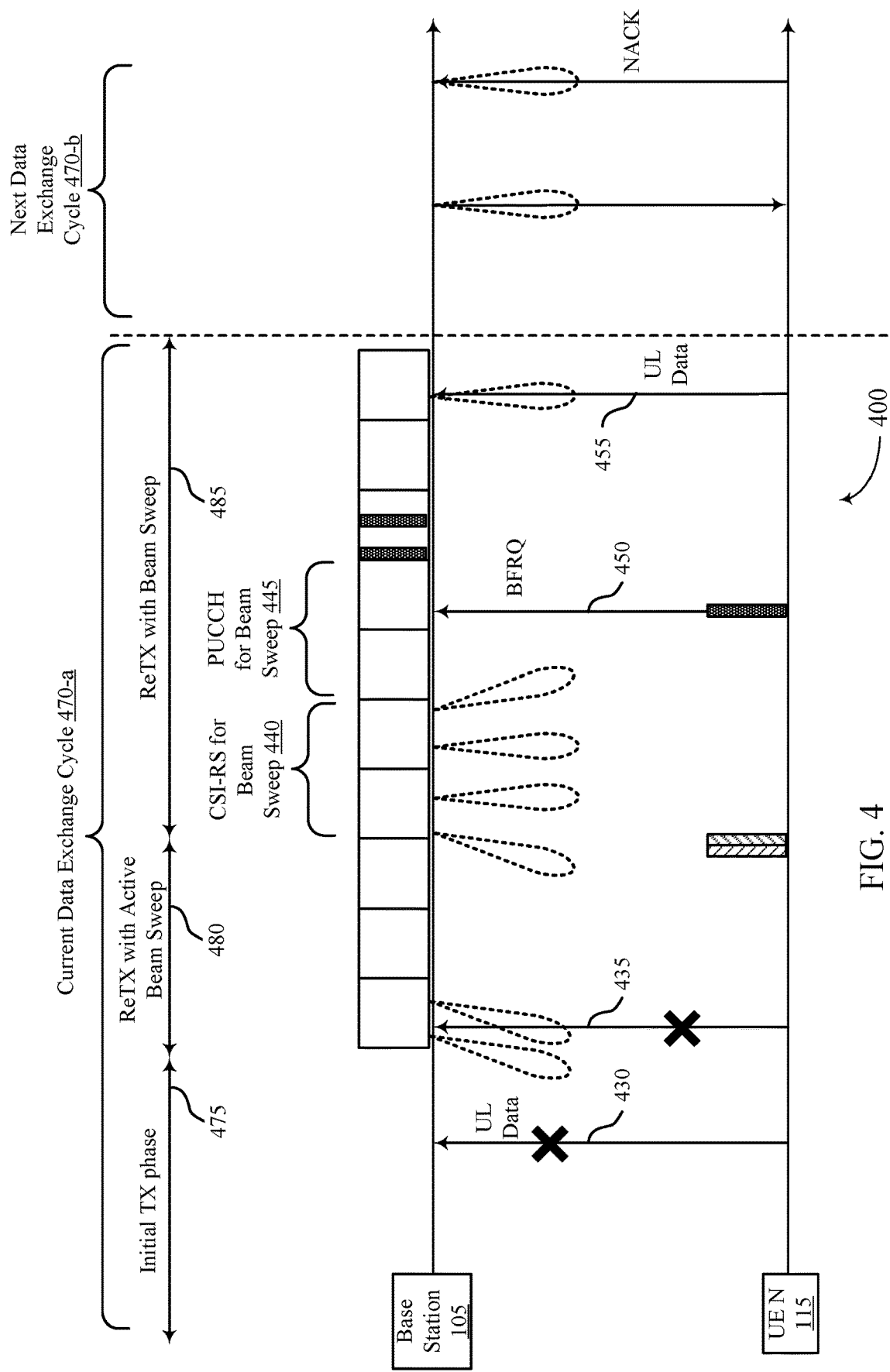
FIG. 4 illustrates an example of a transmission flow that supports techniques for performing retransmission based on a beam sweep in accordance with aspects of the present disclosure.

FIG. 4 illustrates an example of a transmission flow 400 that supports techniques for performing retransmission based on a beam sweep in accordance with aspects of the present disclosure. In some examples, transmission flow 400 may be implemented by aspects of wireless communications system 100. The transmission flow 400 includes a base station 105 and a UE N 115. The transmission flow 400 illustrates communications between base station 105 and UE N 115 during a data exchange cycle 470-a. In an initial transmission phase 475 of the data exchange cycle 470-a, the UE N 115 may transmit an uplink transmission 430 (e.g., an uplink data transmission on resources of a PUSCH allocated for the UE N 115). The utilized resources may correspond to a beam supported by the base station 105. In some cases, the base station 105 may be unable to successfully decode the uplink transmission 430. The uplink transmission 430 may be unsuccessful due to interference or blockage.

In a retransmission phase 480, the UE N 115 may attempt to retransmit the uplink transmission 430 as the transmission 435 using an active beam sweep. The active beam sweep may utilize a set of active beams that are tracked by the UE N 115 or configured at the UE N 115 by the base station 105. During the active beam sweep process, the UE N 115 may communicate the transmission 435 on resources allocated to active beams supported by the base station 105. In some cases, the base station 105 is able to decode the transmission using one or more of the active beams. In other cases, the transmission 435 using the active beam sweep is unsuccessful.

If the initial transmission is unsuccessful and/or the active beam sweep is unsuccessful, then preconfigured resources for a beam sweep (e.g., using a plurality of inactive beams) may be activated for a retransmission phase 485 of the data exchange cycle 470-a. As illustrated in FIG. 4, the base station 105 may utilize two or more downlink slots for transmission of reference signals (e.g., CSI-RS) on downlink resources activated for the beam sweep. For example, each inactive beam may be allocated to a respective downlink resource 440, and a CSI-RS may be transmitted on each beam. The UE N 115 may monitor the downlink resources 440 (e.g., preconfigured downlink resources), measure the reference signals on the downlink resources 440, and select one or more corresponding beams based on the measurements. In a PUCCH 445 (or other uplink channel), the UE N 115 may transmit an indication 450 of the selected beam. For example, various uplink resources (e.g., PUCCH resources) may be allocated for each beam, and the indication 450 may be transmitted on the resources allocated for the selected beam. In some cases, the indication 450 may be referred to a beam phase recovery request (BFRQ).

After the set of beams is selected based on the beam sweep, the UE N 115 may transmit an uplink transmission 455 using resources allocated to the selected beam. In some cases, the uplink transmission 455 is a retransmission of the uplink transmission 430 (e.g., the initial uplink transmission). Based on a successful transmission at 455, the base station 105 may configure the UE N 115 for transmission using the selected beam in a next data exchange cycle 470-b (e.g., at least in an initial transmission in the next data exchange cycle 470-b). As illustrated, the base station 105 and the UE N 115 may communicate in the next data exchange cycle 470-b using the selected beam. A beam update for the next data exchange cycle 470-b may be explicitly signaled by the base station 105 after receiving a downlink feedback response (e.g., HARQ-ACK) or a successful uplink retransmission. In some cases, the beam update for the next data exchange cycle 470-b may be implied if the downlink feedback response (e.g., HARQ-ACK) is transmitted to the base station 105 or the UE N 115 successfully communicates an uplink retransmission.

Figure 5A:
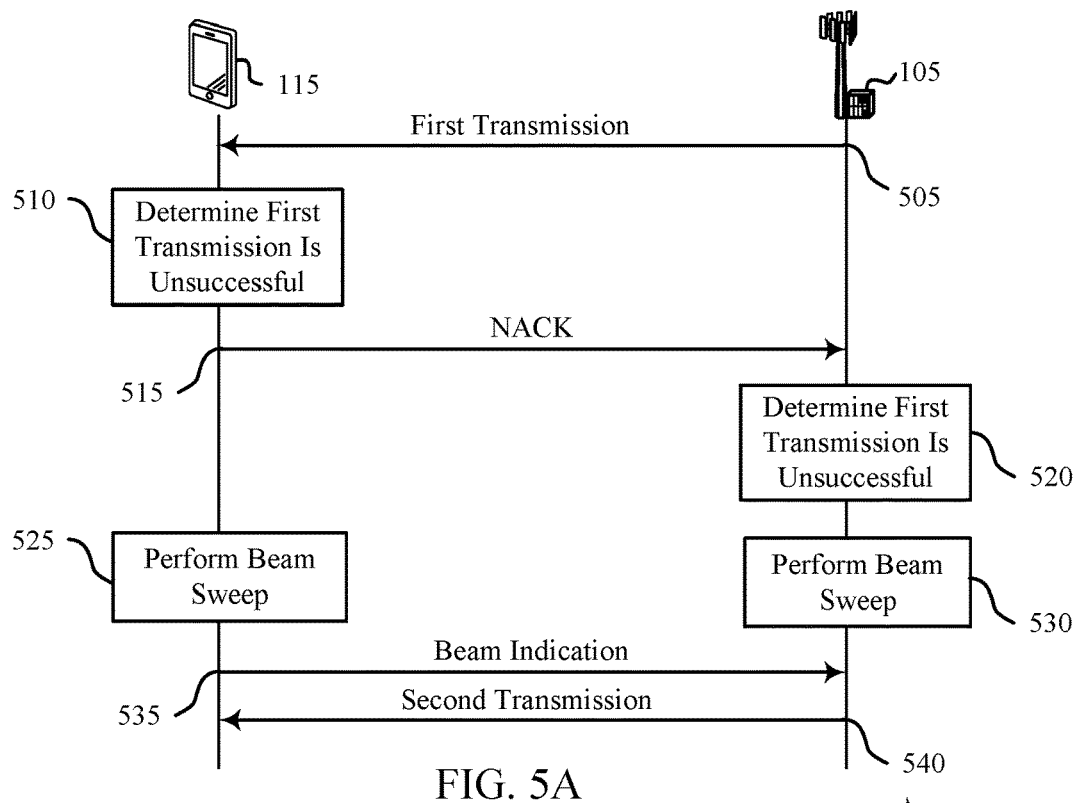
FIGS. 5A and 5B illustrate examples of process flow diagrams that illustrate techniques for performing retransmission based on a beam sweep in accordance with aspects of the present disclosure.
Figure 5B:
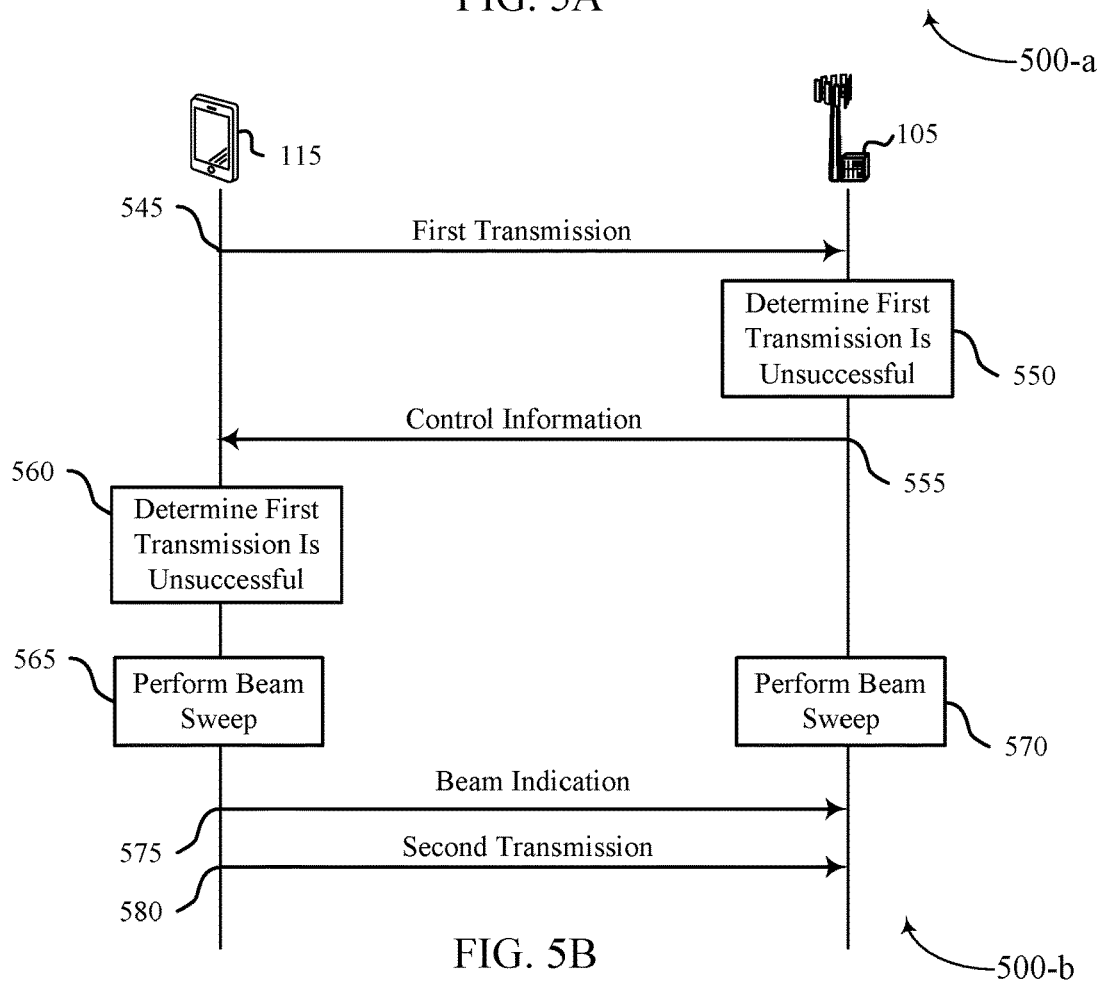

FIGS. 5A and 5B illustrate examples of a process flow diagrams 500-a and 500-b that illustrate techniques for performing retransmission based on a beam sweep in accordance with aspects of the present disclosure. In some examples, process flow diagram 500 may implement aspects of wireless communications system 100. The process flow diagram 500-a and the process flow diagram 500-b include UE 115 and base station 105.

In FIG. 5A, at 505, the base station 105 transmits a first downlink transmission to the UE 115 during a data exchange cycle and on a first set of beams. At 510, the UE 115 determines that the first transmission is unsuccessful. In one example, the determination may be based on a failure to decode the first transmission. At 515, the UE 115 transmits a feedback response (e.g., NACK) to the base station 105. Based on the feedback response, the base station 520 may determine that the first transmission is unsuccessful.

At 525, the UE 115 performs a beam sweep using plurality of inactive beams, and at 530, the base station 105 performs a beam sweep using the plurality of inactive beams based at least in part on the determination that the first transmission on the first set of beams is unsuccessful. The beam sweep may be performed on pre-allocated resources, which may be activated responsive to determining that the first transmission is unsuccessful. A set of reference signals may be allocated to downlink resources, and each reference signal may be transmitted on an inactive beam. The UE 115 may measure the reference signals received on the beams.

At 535, the UE 115 transmits, to the base station 105, an indication of a set of beams. The second set of beams may include one or more beams and may be selected from the plurality of inactive beams based at least in part on the beam sweep (e.g., the measurements of the reference signals). The indication may be transmitted on pre-allocated resources associated with the second set of beams. In some examples, the indication may be transmitted as a BFRQ.

At 540, the base station 105 transmits a second transmission to the UE 115 on the second set of beams based at least in part on receiving the indication. The second transmission may be a retransmission of the first transmission.

In FIG. 5B, at 545, the UE 115 transmits a first uplink transmission the base station 105. At 520, the base station 105 determines that the first transmission is unsuccessful. For example, the base station 105 may be unable to decode the first transmission. At 555, the base station 105 may transmit control information (e.g., PDCCH) to the UE 115. The control information may be a retransmission grant, an indication to perform a beam sweep, etc.

At 560, the UE 115 determines that the first transmission was unsuccessful. The determination may be based on the received control information. At 565, the UE 115 performs a beam sweep using a plurality of inactive beams, and the base station 105 performs the beam sweep using the plurality of inactive beams based at least in part on determining the first transmission was unsuccessful. The beam sweep may be performed on pre-allocated resources, which may be activated responsive to determining that the first transmission is unsuccessful. A set of reference signals may be allocated to downlink resources, and each reference signal may be transmitted on an inactive beam. The UE 115 may measure the reference signals received on the beams.

At 575, the UE 115 transmits, to the base station 105, an indication of a set of beams, where the second set of beams is selected based at least in part on the beam sweep. The second set of beams may include one or more beams and may be selected a least from the plurality of inactive beams based at least in part on the beam sweep (e.g., the measurements of the reference signals). For example, the indication may be transmitted on pre-allocated resources associated with the second set of beams. The indication may be transmitted as a BFRQ.

At 580, the UE 115 transmits a second transmission to the base station 105 on the second set of beams. The second transmission may be retransmission of the first transmission.

Figure 6:
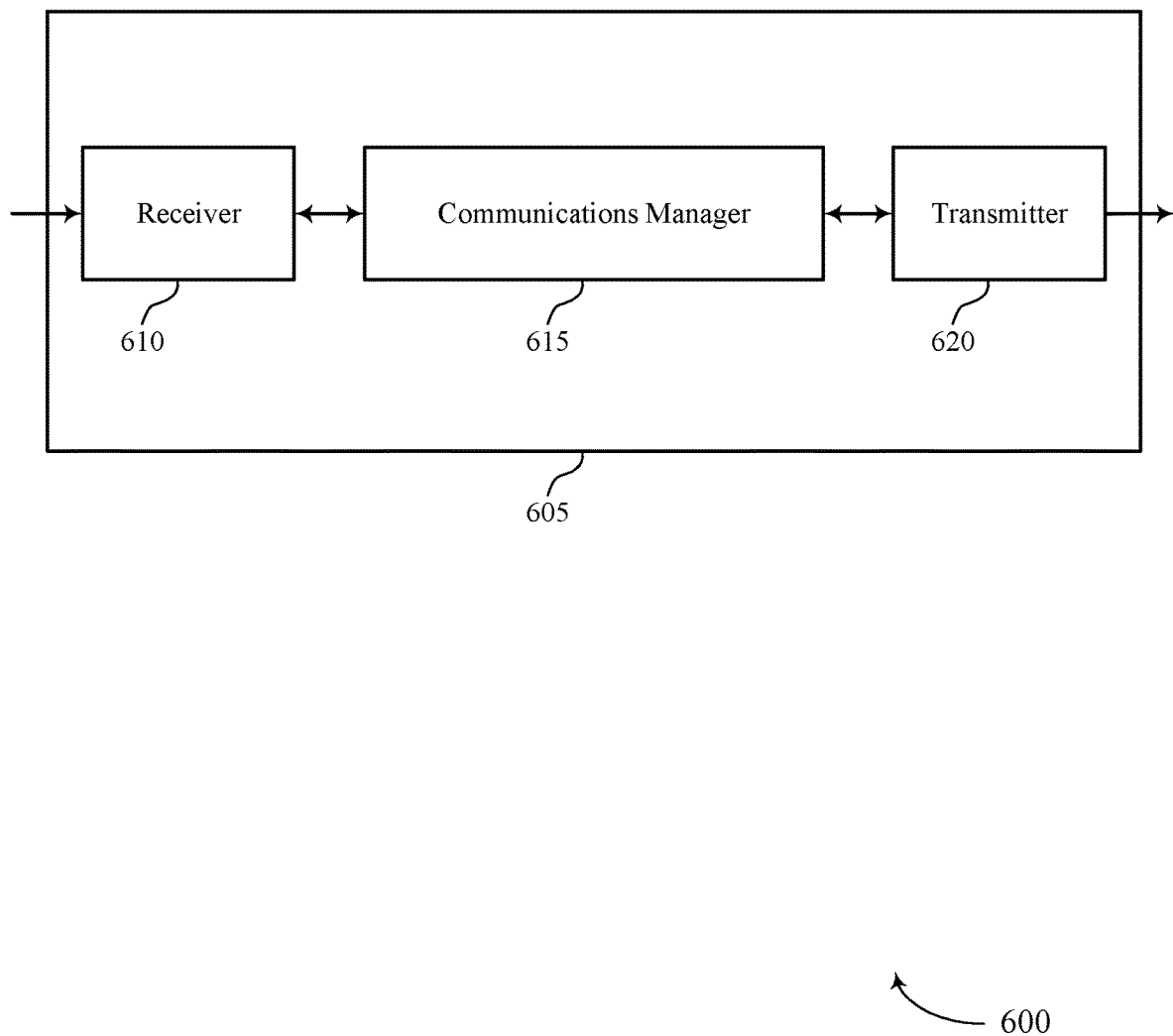
FIGS. 6 and 7 show block diagrams of devices that support techniques for performing retransmission based on a beam sweep in accordance with aspects of the present disclosure.

FIG. 6 shows a block diagram 600 of a device 605 that supports techniques for performing retransmission based on a beam sweep in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for performing retransmission based on a beam sweep, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a first transmission on a first set of beams is unsuccessful, perform a beam sweep using a set of inactive beams based on the determination that the first transmission on the first set of beams is unsuccessful, transmit, to a base station, an indication of a second set of beams, where the second set of beams is selected at least from the set of inactive beams based on the beam sweep, and communicate a second transmission on the second set of beams based on transmitting the indication, where the second transmission is a retransmission of the first transmission. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

One implementation is determining a first transmission on a first set of beams is unsuccessful, performing a beam sweep using a set of inactive beams based on the determination that the first transmission on the first set of beams is unsuccessful, transmitting, to a base station, an indication of a second set of beams, where the second set of beams is selected at least from the set of inactive beams based on the beam sweep, and communicating a second transmission on the second set of beams based on transmitting the indication, where the second transmission is a retransmission of the first transmission. The implementation may be utilized to realize one or more potential advantages. For example, the implementation may allow a UE 115 to save power, increase battery live, and avoid latency hits by quickly identifying beams to utilize for transmission. Thus, rather than waiting for random access resources to reestablish a connection with a base station, the UE 115 may identify a beam during the current transmission cycle, and utilize the identified beams. This may improve quality and reliability in the UE 115 by reducing communication latency in the UE 115.

Further based on this implementation, another advantage is that a processor of the UE 115 may efficiently determine inactive beams for use in communicating with a base station. Thus, rather than using processing resources on a random access process, which may be processor intensive, the processor may be activated to efficiently identify beams.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
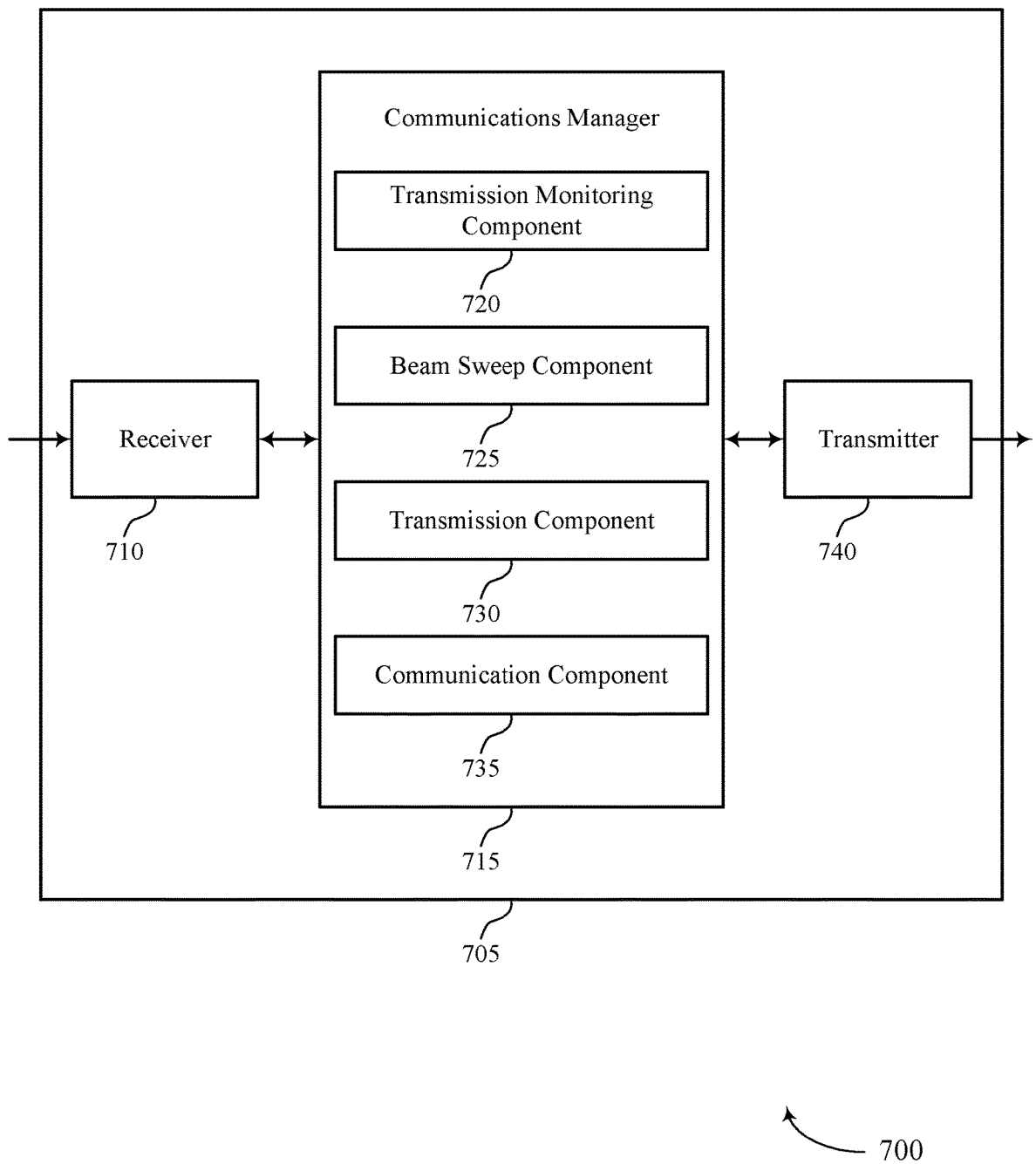

FIG. 7 shows a block diagram 700 of a device 705 that supports techniques for performing retransmission based on a beam sweep in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to techniques for performing retransmission based on a beam sweep, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a transmission monitoring component 720, a beam sweep component 725, a transmission component 730, and a communication component 735. The communications manager 715 may be an example of aspects of the communications manager 910 described herein.

The transmission monitoring component 720 may determine a first transmission on a first set of beams is unsuccessful. The beam sweep component 725 may perform a beam sweep using a set of inactive beams based on the determination that the first transmission on the first set of beams is unsuccessful.

The transmission component 730 may transmit, to a base station, an indication of a second set of beams, where the second set of beams is selected at least from the set of inactive beams based on the beam sweep. The communication component 735 may communicate a second transmission on the second set of beams based on transmitting the indication, where the second transmission is a retransmission of the first transmission.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable. At least one implementation may enable the communications manager 715 to identify a transmission failure associated with an active beam, and perform a beam sweep using a set of inactive beams based on identifying the transmission failure.

In some cases, the communications manager 715 may reestablish communications based on the beam sweep of the set of inactive beams.

Based on implementing the interference mitigation techniques as described herein, one or more processors of the device 705 (e.g., processor(s) controlling or incorporated with one or more of receiver 710, communications manager 715, and transmitter 720) may reduce communications latency and interference effects using the beam sweep of inactive beams. In some examples, the techniques described herein may increase communications reliability by performing retransmissions based on identifying failure of a first transmission attempt.

Figure 8:
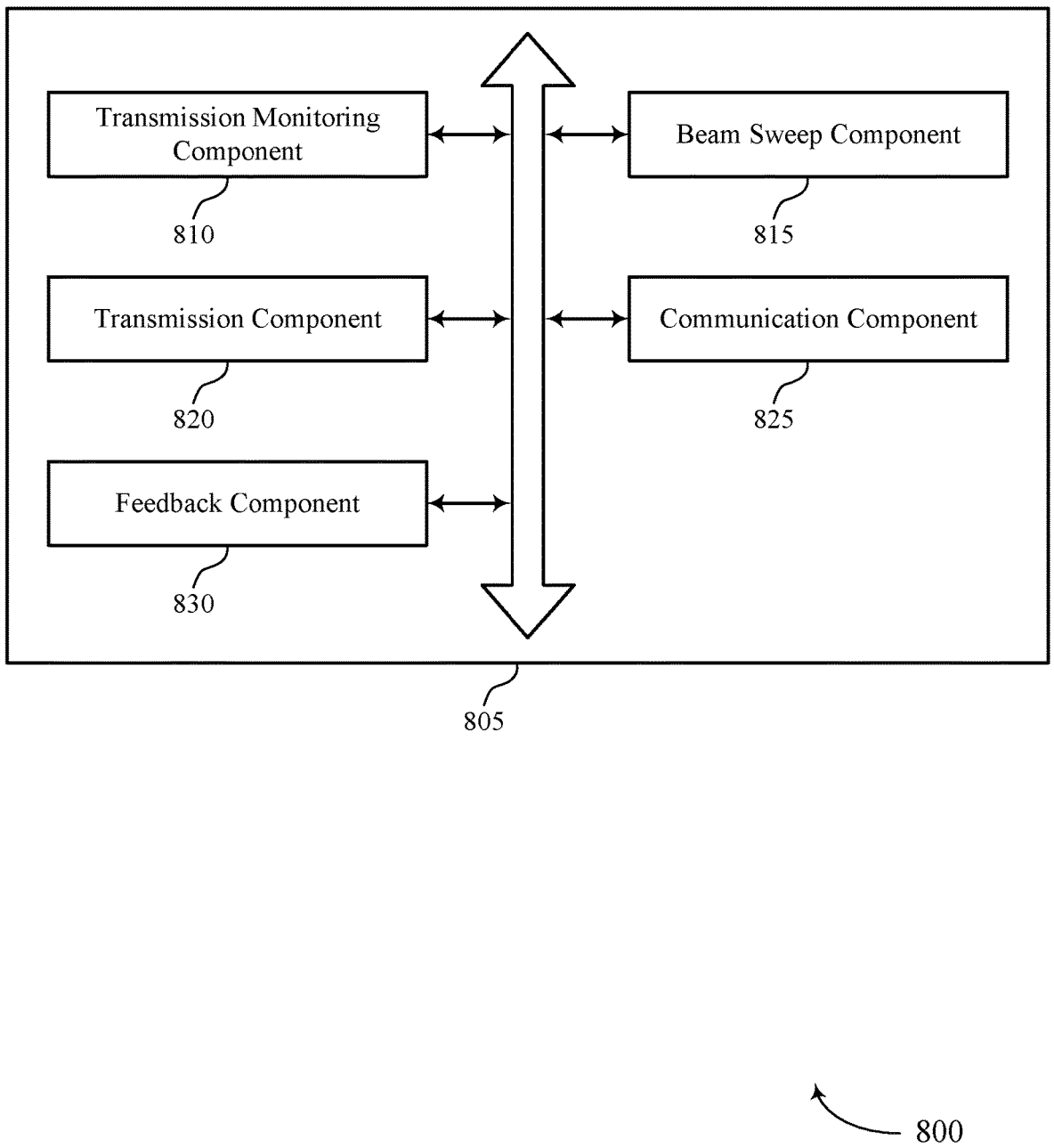
FIG. 8 shows a block diagram of a communications manager that supports techniques for performing retransmission based on a beam sweep in accordance with aspects of the present disclosure.

FIG. 8 shows a block diagram 800 of a communications manager 805 that supports techniques for performing retransmission based on a beam sweep in accordance with aspects of the present disclosure. The communications manager 805 may be an example of aspects of a communications manager 615, a communications manager 715, or a communications manager 910 described herein. The communications manager 805 may include a transmission monitoring component 810, a beam sweep component 815, a transmission component 820, a communication component 825, and a feedback component 830. Each of these components may communicate, directly or indirectly, with one another (e.g., via one or more buses).

The transmission monitoring component 810 may determine a first transmission on a first set of beams is unsuccessful. In some examples, the transmission monitoring component 810 may determine a failure to successfully transmit an uplink data message to the base station. In some examples, the transmission monitoring component 810 may determine a first retransmission of the first transmission using the first set of beams is unsuccessful, where the first set of beams include a set of active beams.

The beam sweep component 815 may perform a beam sweep using a set of inactive beams based on the determination that the first transmission on the first set of beams is unsuccessful. In some examples, the beam sweep component 815 may receive, from the base station, a configuration of a downlink resource set including a set of reference signals, where each reference signal of the set of reference signals is transmitted using one of the set of inactive beams; and selecting the second set of beams based on a measurement of each reference signal of the set of reference signals.

In some examples, the beam sweep component 815 may receive, from the base station, an indication of an uplink resource set allocated for transmitting the indication of the second set of beams. In some examples, the beam sweep component 815 may receive, from the base station, a signal activating the beam sweep. In some examples, the beam sweep component 815 may perform the beam sweep using the set of inactive beams based on determining the retransmission is unsuccessful.

In some examples, the beam sweep component 815 may perform a first beam sweep using the set of active beams prior to performing the beam sweep using the set of inactive beams. In some examples, the beam sweep component 815 may determine a failure to identify an active beam of the set of active beams based on performing the first beam sweep.

In some examples, the beam sweep component 815 may receive a configuration of the first set of beams prior to determining the first transmission on the first set of beams is unsuccessful. In some cases, the downlink resource set is activated responsive to determining the first transmission on the first set of beams is unsuccessful. In some cases, the uplink resource set is activated responsive to determining the first transmission on the first set of beams is unsuccessful.

The transmission component 820 may transmit, to a base station, an indication of a second set of beams, where the second set of beams is selected at least from the set of inactive beams based on the beam sweep. In some examples, the transmission component 820 may transmit the indication of the second set of beams using uplink resources allocated for the second set of beams.

The communication component 825 may communicate a second transmission on the second set of beams based on transmitting the indication, where the second transmission is a retransmission of the first transmission. In some examples, the communication component 825 may receive the second transmission on a downlink channel using the second set of beams.

In some examples, the communication component 825 may transmit the retransmission on an uplink channel using the second set of beams.

In some examples, the communication component 825 may identify the second set of beams for communication in a next data exchange cycle. In some examples, the communication component 825 may communicate with the base station using the second set of beams in the next data exchange cycle.

In some cases, the first transmission and the second transmission are communicated during a data exchange cycle scheduled between the UE and the base station. In some cases, the communication of the second transmission is conducted over a downlink control channel, a downlink shared channel, an uplink control channel, an uplink shared channel, or a combination thereof. The feedback component 830 may transmit a HARQ feedback response associated with a downlink transmission received from the base station.

Figure 9:
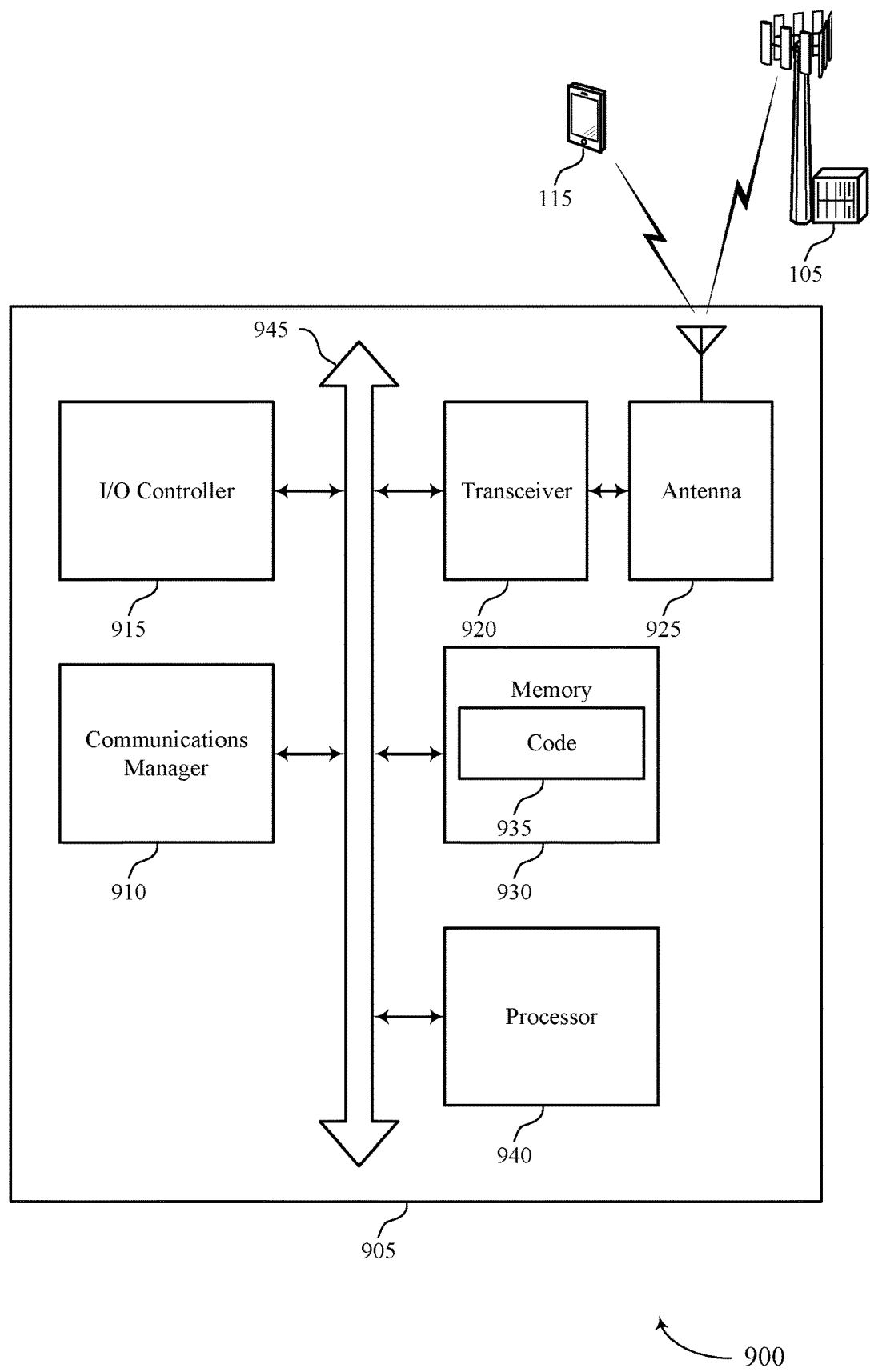
FIG. 9 shows a diagram of a system including a device that supports techniques for performing retransmission based on a beam sweep in accordance with aspects of the present disclosure.

FIG. 9 shows a diagram of a system 900 including a device 905 that supports techniques for performing retransmission based on a beam sweep in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a first transmission on a first set of beams is unsuccessful, perform a beam sweep using a set of inactive beams based on the determination that the first transmission on the first set of beams is unsuccessful, transmit, to a base station, an indication of a second set of beams, where the second set of beams is selected at least from the set of inactive beams based on the beam sweep, and communicate a second transmission on the second set of beams based on transmitting the indication, where the second transmission is a retransmission of the first transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, an field-programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing retransmission based on a beam sweep).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
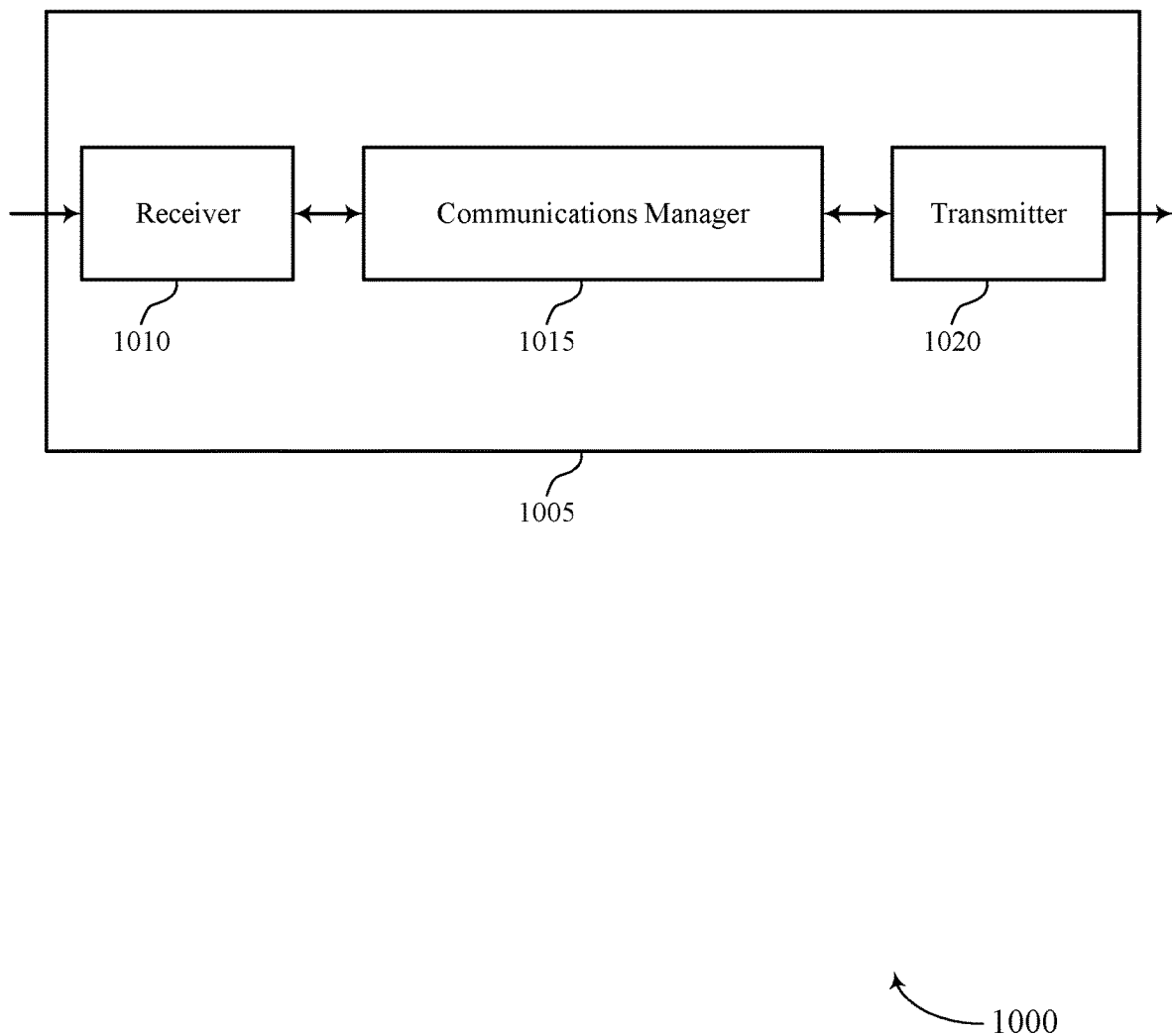
FIGS. 10 and 11 show block diagrams of devices that support techniques for performing retransmission based on a beam sweep in accordance with aspects of the present disclosure.

FIG. 10 shows a block diagram 1000 of a device 1005 that supports techniques for performing retransmission based on a beam sweep in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for performing retransmission based on a beam sweep, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a first transmission on a first set of beams is unsuccessful, perform a beam sweep using a set of inactive beams based on the determination that the first transmission on the first set of beams is unsuccessful, receive, from the UE, an indication of a second set of beams, where the second set of beams is selected at least from the set of inactive beams based on the beam sweep, and communicate a second transmission on the second set of beams based on receiving the indication, where the second transmission is a retransmission of the first transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
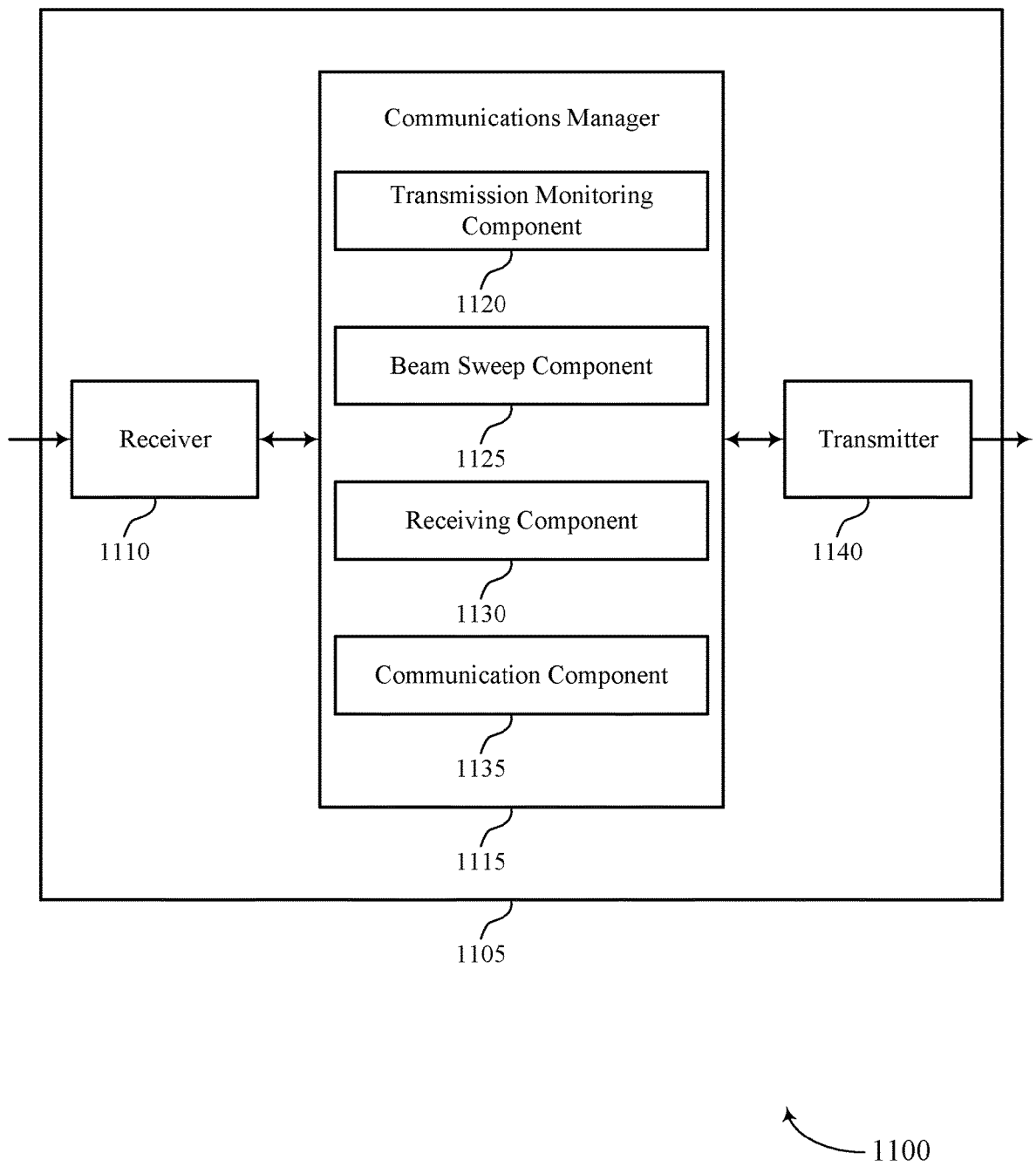

FIG. 11 shows a block diagram 1100 of a device 1105 that supports techniques for performing retransmission based on a beam sweep in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for performing retransmission based on a beam sweep, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a transmission monitoring component 1120, a beam sweep component 1125, a receiving component 1130, and a communication component 1135. The communications manager 1115 may be an example of aspects of the communications manager 1310 described herein.

The transmission monitoring component 1120 may determine a first transmission on a first set of beams is unsuccessful. The beam sweep component 1125 may perform a beam sweep using a set of inactive beams based on the determination that the first transmission on the first set of beams is unsuccessful.

The receiving component 1130 may receive, from the UE, an indication of a second set of beams, where the second set of beams is selected at least from the set of inactive beams based on the beam sweep. The communication component 1135 may communicate a second transmission on the second set of beams based on receiving the indication, where the second transmission is a retransmission of the first transmission.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
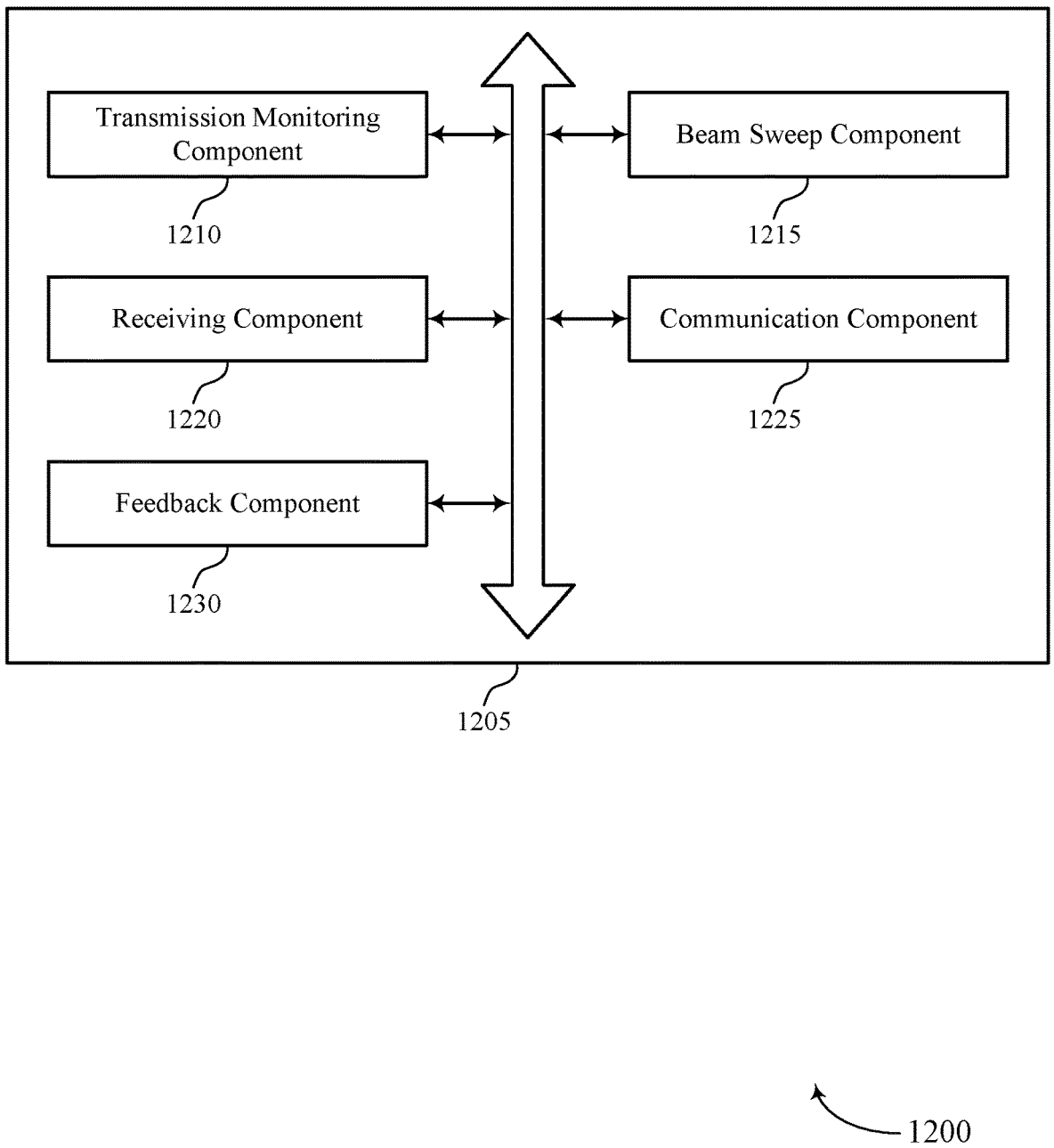
FIG. 12 shows a block diagram of a communications manager that supports techniques for performing retransmission based on a beam sweep in accordance with aspects of the present disclosure.

FIG. 12 shows a block diagram 1200 of a communications manager 1205 that supports techniques for performing retransmission based on a beam sweep in accordance with aspects of the present disclosure. The communications manager 1205 may be an example of aspects of a communications manager 1015, a communications manager 1115, or a communications manager 1310 described herein. The communications manager 1205 may include a transmission monitoring component 1210, a beam sweep component 1215, a receiving component 1220, a communication component 1225, and a feedback component 1230. Each of these components may communicate, directly or indirectly, with one another (e.g., via one or more buses).

The transmission monitoring component 1210 may determine a first transmission on a first set of beams is unsuccessful. In some examples, the transmission monitoring component 1210 may determine a failure to successfully receive an uplink data message from the UE.

The beam sweep component 1215 may perform a beam sweep using a set of inactive beams based on the determination that the first transmission on the first set of beams is unsuccessful. In some examples, the beam sweep component 1215 may transmit, to the UE, a configuration of a downlink resource set including a set of reference signals, where each reference signal of the set of reference signals is transmitted using one of the set of inactive beams; and selecting the second set of beams based on a measurement of each reference signal of the set of reference signals. In some examples, the beam sweep component 1215 may transmit, to the UE, an indication of an uplink resource set allocated for receiving the indication of the second set of beams.

In some examples, the beam sweep component 1215 may transmit, to the UE, a signal activating the beam sweep. In some examples, the beam sweep component 1215 may determine a first retransmission of the first transmission using the first set of beams is unsuccessful, where the first set of beams include a set of active beams. In some examples, the beam sweep component 1215 may perform the beam sweep using the set of inactive beams based on determining the first retransmission. In some examples, the beam sweep component 1215 may perform a first beam sweep using the set of active beams prior to performing the beam sweep using the set of inactive beam.

In some examples, the beam sweep component 1215 may determine a failure to identify an active beam of the set of active beams based on performing the first beam sweep. In some examples, the beam sweep component 1215 may transmit a configuration of the first set of beams prior to determining the first transmission on the first set of beams is unsuccessful. In some cases, the downlink resource set is activated responsive to determining the first transmission on the first set of beams is unsuccessful. In some cases, the uplink resource set is activated responsive to determining the first transmission on the first set of beams is unsuccessful.

The receiving component 1220 may receive, from the UE, an indication of a second set of beams, where the second set of beams is selected at least from the set of inactive beams based on the beam sweep. In some examples, the receiving component 1220 may receive the indication of the second set of beams using uplink resources allocated for the second set of beams.

The communication component 1225 may communicate a second transmission on the second set of beams based on receiving the indication, where the second transmission is a retransmission of the first transmission. In some examples, the communication component 1225 may transmit the retransmission on a downlink channel using the second set of beams. In some examples, the communication component 1225 may receive the retransmission on an uplink channel using the second set of beams.

In some examples, the communication component 1225 may identify the second set of beams for communication in a next data exchange cycle. In some examples, the communication component 1225 may communicate with the UE using the second set of beams in the next data exchange cycle. In some cases, the first transmission and the second transmission are communicated during a data exchange cycle scheduled between the UE and the base station.

In some cases, the communication of the second transmission is conducted over a downlink control channel, a downlink shared channel, an uplink control channel, an uplink shared channel, or a combination thereof.

The feedback component 1230 may receive a HARQ feedback response associated with a downlink transmission transmitted to the UE.

Figure 13:
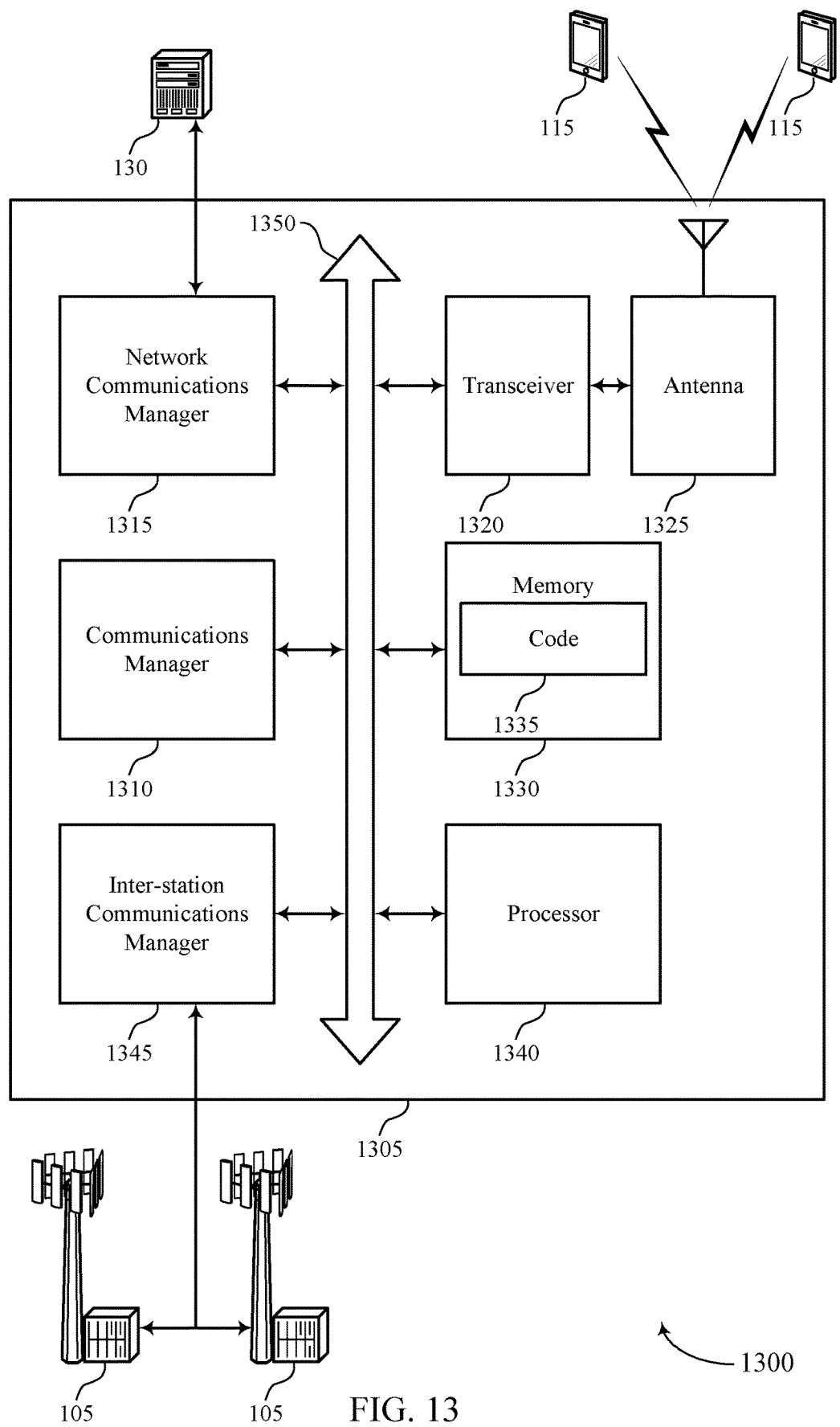
FIG. 13 shows a diagram of a system including a device that supports techniques for performing retransmission based on a beam sweep in accordance with aspects of the present disclosure.

FIG. 13 shows a diagram of a system 1300 including a device 1305 that supports techniques for performing retransmission based on a beam sweep in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a first transmission on a first set of beams is unsuccessful, perform a beam sweep using a set of inactive beams based on the determination that the first transmission on the first set of beams is unsuccessful, receive, from the UE, an indication of a second set of beams, where the second set of beams is selected at least from the set of inactive beams based on the beam sweep, and communicate a second transmission on the second set of beams based on receiving the indication, where the second transmission is a retransmission of the first transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for performing retransmission based on a beam sweep).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
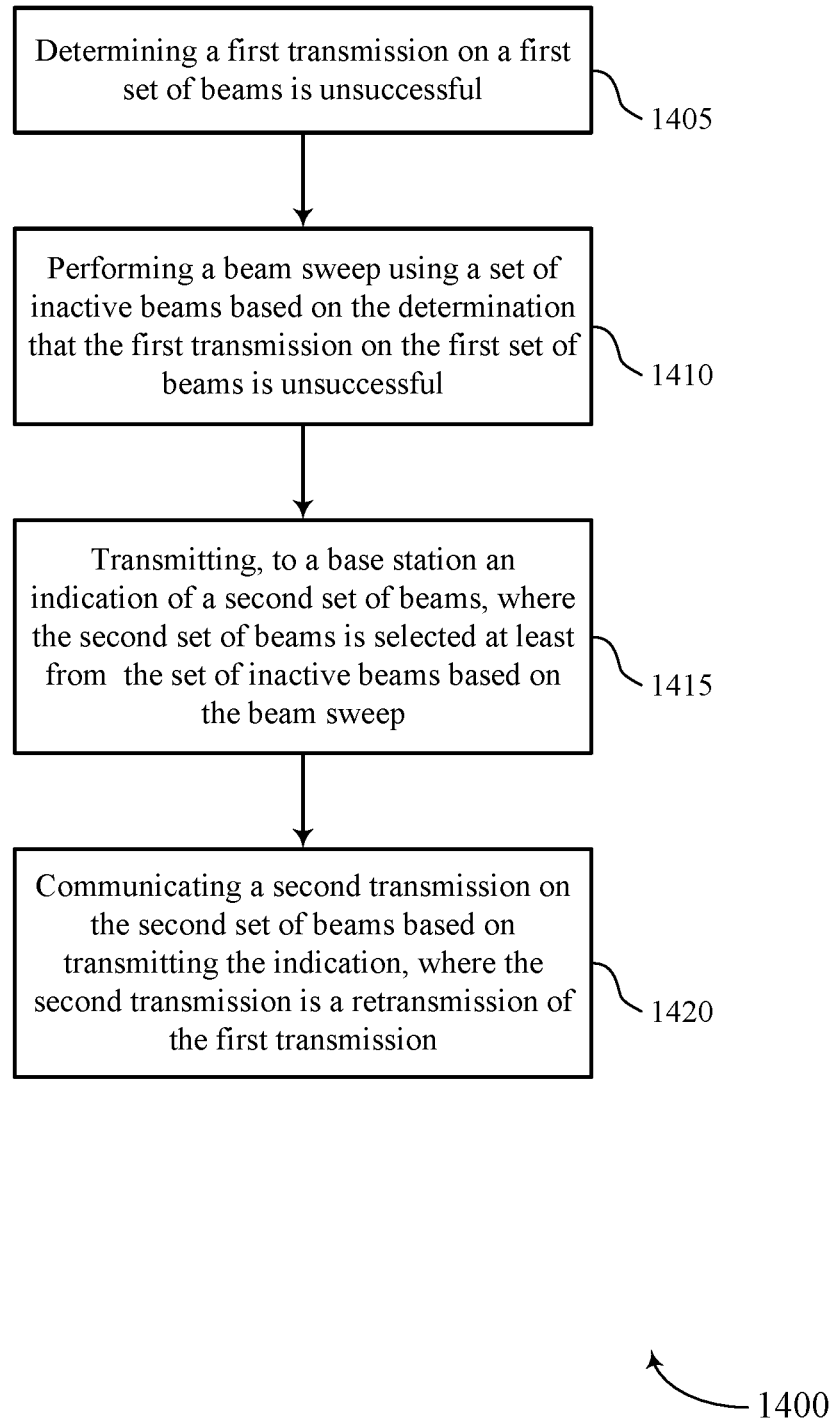
FIGS. 14 through 17 show flowcharts illustrating methods that support techniques for performing retransmission based on a beam sweep in accordance with aspects of the present disclosure.

FIG. 14 shows a flowchart illustrating a method 1400 that supports techniques for performing retransmission based on a beam sweep in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may determine a first transmission on a first set of beams is unsuccessful. The operations of 1405 may be performed according to the methods described herein. In some examples, aspects of the operations of 1405 may be performed by a transmission monitoring component as described with reference to FIGS. 6 through 9.

At 1410, the UE may perform a beam sweep using a set of inactive beams based on the determination that the first transmission on the first set of beams is unsuccessful. The operations of 1410 may be performed according to the methods described herein. In some examples, aspects of the operations of 1410 may be performed by a beam sweep component as described with reference to FIGS. 6 through 9.

At 1415, the UE may transmit, to a base station, an indication of a second set of beams, where the second set of beams is selected at least from the set of inactive beams based on the beam sweep. The operations of 1415 may be performed according to the methods described herein. In some examples, aspects of the operations of 1415 may be performed by a transmission component as described with reference to FIGS. 6 through 9.

At 1420, the UE may communicate a second transmission on the second set of beams based on transmitting the indication, where the second transmission is a retransmission of the first transmission. The operations of 1420 may be performed according to the methods described herein. In some examples, aspects of the operations of 1420 may be performed by a communication component as described with reference to FIGS. 6 through 9.

Figure 15:
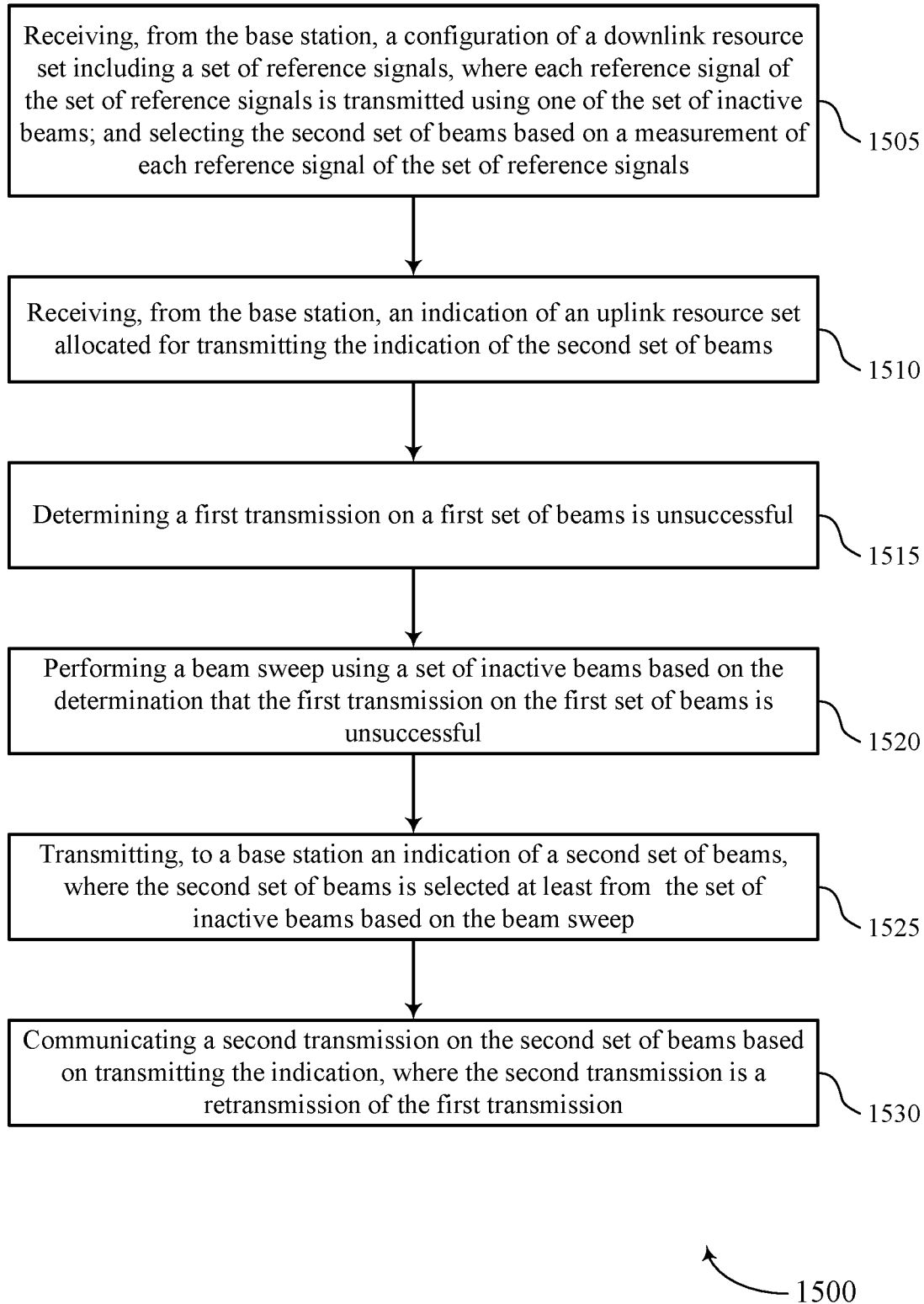

FIG. 15 shows a flowchart illustrating a method 1500 that supports techniques for performing retransmission based on a beam sweep in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from the base station, a configuration of a downlink resource set including a set of reference signals, where each reference signal of the set of reference signals is transmitted using one of the set of inactive beams; and selecting the second set of beams based on a measurement of each reference signal of the set of reference signals. The operations of 1505 may be performed according to the methods described herein. In some examples, aspects of the operations of 1505 may be performed by a beam sweep component as described with reference to FIGS. 6 through 9.

At 1510, the UE may receive, from the base station, an indication of an uplink resource set allocated for transmitting the indication of the second set of beams. The operations of 1510 may be performed according to the methods described herein. In some examples, aspects of the operations of 1510 may be performed by a beam sweep component as described with reference to FIGS. 6 through 9.

At 1515, the UE may determine a first transmission on a first set of beams is unsuccessful. The operations of 1515 may be performed according to the methods described herein. In some examples, aspects of the operations of 1515 may be performed by a transmission monitoring component as described with reference to FIGS. 6 through 9.

At 1520, the UE may perform a beam sweep using a set of inactive beams based on the determination that the first transmission on the first set of beams is unsuccessful. The operations of 1520 may be performed according to the methods described herein. In some examples, aspects of the operations of 1520 may be performed by a beam sweep component as described with reference to FIGS. 6 through 9.

At 1525, the UE may transmit, to a base station, an indication of a second set of beams, where the second set of beams is selected at least from the set of inactive beams based on the beam sweep. The operations of 1525 may be performed according to the methods described herein. In some examples, aspects of the operations of 1525 may be performed by a transmission component as described with reference to FIGS. 6 through 9.

At 1530, the UE may communicate a second transmission on the second set of beams based on transmitting the indication, where the second transmission is a retransmission of the first transmission. The operations of 1530 may be performed according to the methods described herein. In some examples, aspects of the operations of 1530 may be performed by a communication component as described with reference to FIGS. 6 through 9.

Figure 16:
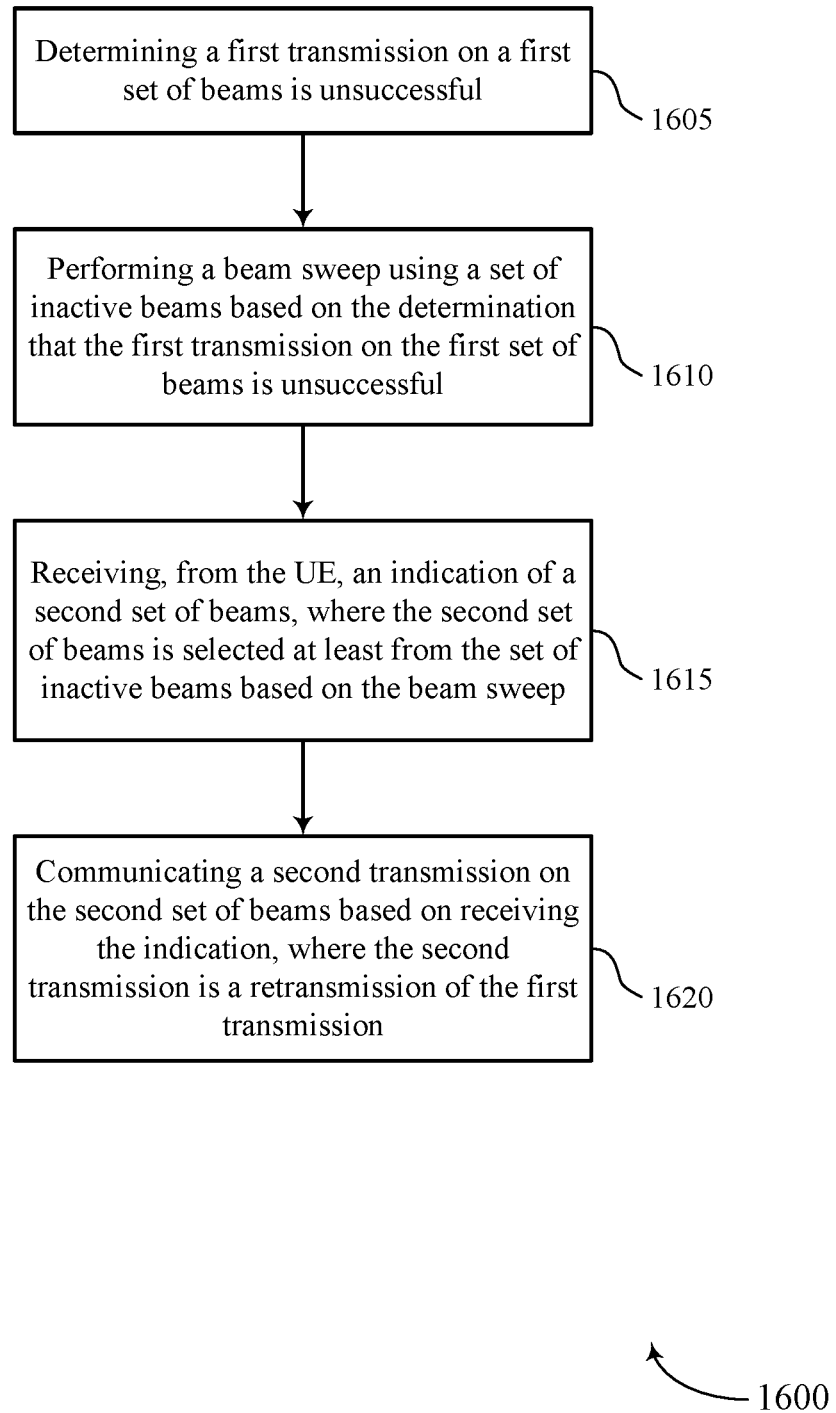

FIG. 16 shows a flowchart illustrating a method 1600 that supports techniques for performing retransmission based on a beam sweep in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may determine a first transmission on a first set of beams is unsuccessful. The operations of 1605 may be performed according to the methods described herein. In some examples, aspects of the operations of 1605 may be performed by a transmission monitoring component as described with reference to FIGS. 10 through 13.

At 1610, the base station may perform a beam sweep using a set of inactive beams based on the determination that the first transmission on the first set of beams is unsuccessful. The operations of 1610 may be performed according to the methods described herein. In some examples, aspects of the operations of 1610 may be performed by a beam sweep component as described with reference to FIGS. 10 through 13.

At 1615, the base station may receive, from the UE, an indication of a second set of beams, where the second set of beams is selected at least from the set of inactive beams based on the beam sweep. The operations of 1615 may be performed according to the methods described herein. In some examples, aspects of the operations of 1615 may be performed by a receiving component as described with reference to FIGS. 10 through 13.

At 1620, the base station may communicate a second transmission on the second set of beams based on receiving the indication, where the second transmission is a retransmission of the first transmission. The operations of 1620 may be performed according to the methods described herein. In some examples, aspects of the operations of 1620 may be performed by a communication component as described with reference to FIGS. 10 through 13.

Figure 17:
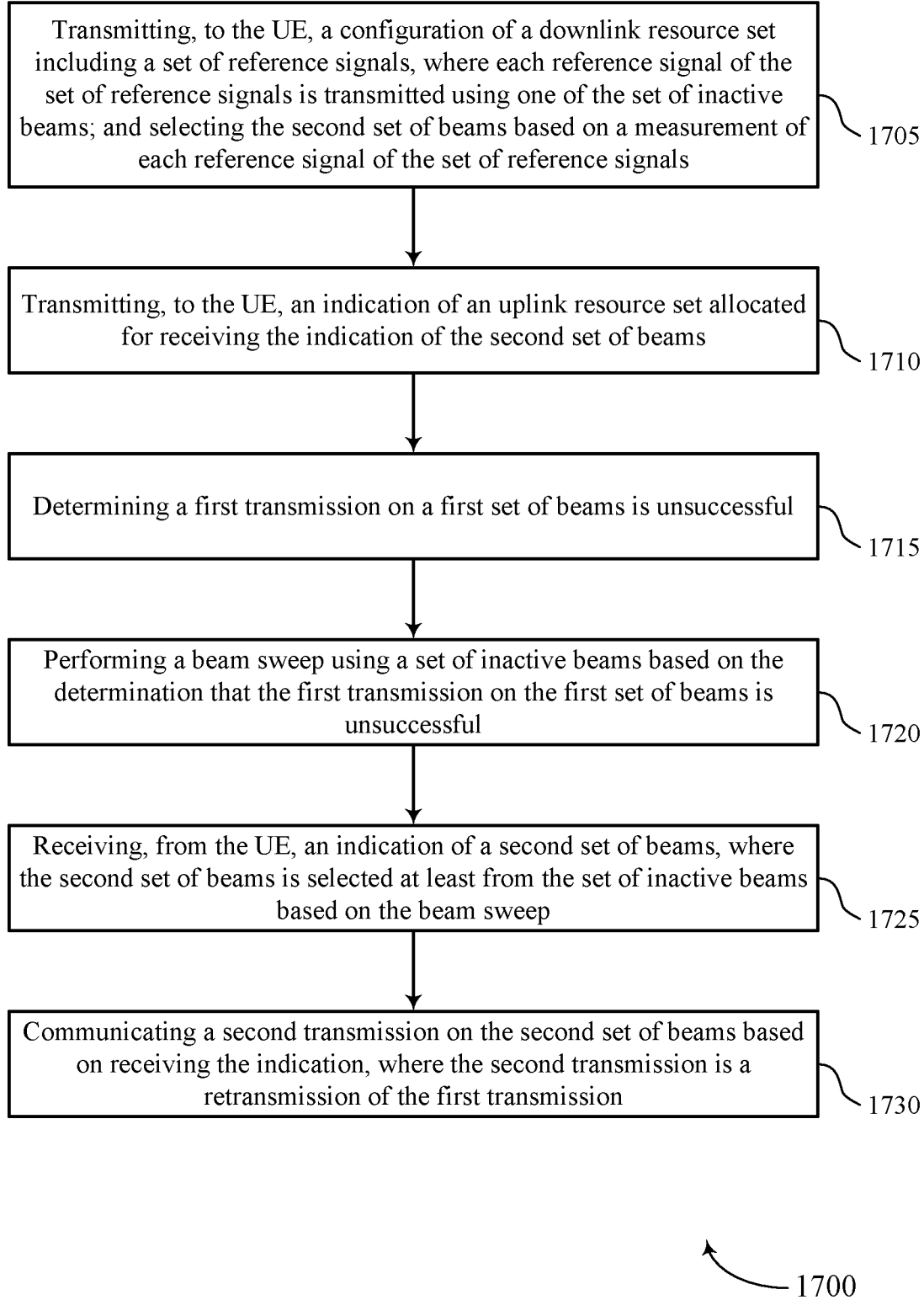

FIG. 17 shows a flowchart illustrating a method 1700 that supports techniques for performing retransmission based on a beam sweep in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to the UE, a configuration of a downlink resource set including a set of reference signals, where each reference signal of the set of reference signals is transmitted using one of the set of inactive beams; and selecting the second set of beams based on a measurement of each reference signal of the set of reference signals. The operations of 1705 may be performed according to the methods described herein. In some examples, aspects of the operations of 1705 may be performed by a beam sweep component as described with reference to FIGS. 10 through 13.

At 1710, the base station may transmit, to the UE, an indication of an uplink resource set allocated for receiving the indication of the second set of beams. The operations of 1710 may be performed according to the methods described herein. In some examples, aspects of the operations of 1710 may be performed by a beam sweep component as described with reference to FIGS. 10 through 13.

At 1715, the base station may determine a first transmission on a first set of beams is unsuccessful. The operations of 1715 may be performed according to the methods described herein. In some examples, aspects of the operations of 1715 may be performed by a transmission monitoring component as described with reference to FIGS. 10 through 13.

At 1720, the base station may perform a beam sweep using a set of inactive beams based on the determination that the first transmission on the first set of beams is unsuccessful. The operations of 1720 may be performed according to the methods described herein. In some examples, aspects of the operations of 1720 may be performed by a beam sweep component as described with reference to FIGS. 10 through 13.

At 1725, the base station may receive, from the UE, an indication of a second set of beams, where the second set of beams is selected at least from the set of inactive beams based on the beam sweep. The operations of 1725 may be performed according to the methods described herein. In some examples, aspects of the operations of 1725 may be performed by a receiving component as described with reference to FIGS. 10 through 13.

At 1730, the base station may communicate a second transmission on the second set of beams based on receiving the indication, where the second transmission is a retransmission of the first transmission. The operations of 1730 may be performed according to the methods described herein. In some examples, aspects of the operations of 1730 may be performed by a communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    determining a first transmission on a first set of active beams is unsuccessful;
    performing a beam sweep using a plurality of inactive beams different from the first set of active beams based at least in part on the determination that the first transmission on the first set of active beams is unsuccessful;
    transmitting, to a base station, an indication of a second set of beams, wherein the second set of beams is selected at least from the plurality of inactive beams based at least in part on the beam sweep; and
    communicating a second transmission on the second set of beams based at least in part on transmitting the indication, wherein the second transmission is a retransmission of the first transmission.

2. The method of claim 1, wherein the first transmission and the second transmission are communicated during a data exchange cycle scheduled between the UE and the base station.

3. The method of claim 1, wherein determining the first transmission on the first set of active beams is unsuccessful further comprises:
    transmitting a hybrid automatic repeat request (HARQ) feedback response associated with a downlink transmission received from the base station.

4. The method of claim 1, wherein determining the first transmission on the first set of active beams is unsuccessful further comprises:
    determining a failure to successfully transmit an uplink data message to the base station.

5. The method of claim 1, further comprising:
    receiving, from the base station, a configuration of a downlink resource set including a set of reference signals, wherein each reference signal of the set of reference signals is transmitted using one of the plurality of inactive beams; and
    selecting the second set of beams based at least in part on a measurement of each reference signal of the set of reference signals.

6. The method of claim 5, wherein the downlink resource set is activated responsive to determining the first transmission on the first set of active beams is unsuccessful.

7. The method of claim 1, further comprising:
    receiving, from the base station, an indication of an uplink resource set allocated for transmitting the indication of the second set of beams.

8. The method of claim 7, wherein the uplink resource set is activated responsive to determining the first transmission on the first set of active beams is unsuccessful.

9. The method of claim 1, further comprising:
    transmitting the indication of the second set of beams using uplink resources allocated for the second set of beams.

10. The method of claim 1, wherein communicating the second transmission on the second set of beams further comprises:
    receiving the second transmission on a downlink channel using the second set of beams.

11. The method of claim 1, wherein communicating the second transmission on the second set of beams further comprises:

transmitting the retransmission on an uplink channel using the second set of beams.

12. The method of claim 1, wherein the communication of the second transmission is conducted over a downlink control channel, a downlink shared channel, an uplink control channel, an uplink shared channel, or a combination thereof.

13. The method of claim 1, further comprising:
identifying the second set of beams for communication in a next data exchange cycle; and
communicating with the base station using the second set of beams in the next data exchange cycle.

14. The method of claim 1, further comprising:
receiving, from the base station, a signal activating the beam sweep.

15. The method of claim 1, further comprising:
determining a first retransmission of the first transmission using the first set of active beams is unsuccessful; and
performing the beam sweep using the plurality of inactive beams different from the first set of active beams based at least in part on determining the retransmission is unsuccessful.

16. The method of claim 15, wherein determining the first retransmission is unsuccessful further comprises:
performing a first beam sweep using the first set of active beams prior to performing the beam sweep using the plurality of inactive beams; and
determining a failure to identify an active beam of the first set of active beams based at least in part on performing the first beam sweep.

17. The method of claim 1, further comprising:
receiving a configuration of the first set of active beams prior to determining the first transmission on the first set of active beams is unsuccessful.

18. A method for wireless communications at a base station, comprising:
determining a first transmission on a first set of active beams is unsuccessful;
performing a beam sweep using a plurality of inactive beams different from the first set of active beams based at least in part on the determination that the first transmission on the first set of active beams is unsuccessful;
receiving, from a user equipment (UE), an indication of a second set of beams, wherein the second set of beams is selected at least from the plurality of inactive beams based at least in part on the beam sweep; and
communicating a second transmission on the second set of beams based at least in part on receiving the indication, wherein the second transmission is a retransmission of the first transmission.

19. The method of claim 18, further comprising:
transmitting, to the UE, a configuration of a downlink resource set including a set of reference signals, wherein each reference signal of the set of reference signals is transmitted using one of the plurality of inactive beams; and
selecting the second set of beams based at least in part on a measurement of each reference signal of the set of reference signals.

20. The method of claim 19, wherein the downlink resource set is activated responsive to determining the first transmission on the first set of active beams is unsuccessful.

21. The method of claim 18, further comprising:
transmitting, to the UE, an indication of an uplink resource set allocated for receiving the indication of the second set of beams.

22. The method of claim 21, wherein the uplink resource set is activated responsive to determining the first transmission on the first set of active beams is unsuccessful.

23. The method of claim 18, wherein the first transmission and the second transmission are communicated during a data exchange cycle scheduled between the UE and the base station.

24. The method of claim 18, wherein determining the first transmission on the first set of active beams is unsuccessful further comprises:
receiving a hybrid automatic repeat request (HARQ) feedback response associated with a downlink transmission transmitted to the UE.

25. The method of claim 18, wherein determining the first transmission on the first set of active beams is unsuccessful further comprises:
determining a failure to successfully receive an uplink data message from the UE.

26. The method of claim 18, further comprising:
receiving the indication of the second set of beams using uplink resources allocated for the second set of beams.

27. The method of claim 18, wherein communicating the second transmission on the second set of beams further comprises:
transmitting the retransmission on a downlink channel using the second set of beams.

28. The method of claim 18, wherein communicating the second transmission on the second set of beams further comprises:
receiving the retransmission on an uplink channel using the second set of beams.

29. An apparatus for wireless communications at a user equipment (UE), comprising:
a processor,
memory coupled with the processor; and
instructions stored in the memory and executable by the processor to cause the apparatus to:
determine a first transmission on a first set of active beams is unsuccessful;
perform a beam sweep using a plurality of inactive beams different from the first set of active beams based at least in part on the determination that the first transmission on the first set of active beams is unsuccessful;
transmit, to a base station, an indication of a second set of beams, wherein the second set of beams is selected at least from the plurality of inactive beams based at least in part on the beam sweep; and
communicate a second transmission on the second set of beams based at least in part on transmitting the indication, wherein the second transmission is a retransmission of the first transmission.

30. An apparatus for wireless communications at a base station, comprising:
a processor,
memory coupled with the processor; and
instructions stored in the memory and executable by the processor to cause the apparatus to:
determine a first transmission on a first set of active beams is unsuccessful;
perform a beam sweep using a plurality of inactive beams different from the first set of active beams based at least in part on the determination that the first transmission on the first set of active beams is unsuccessful;
receive, from a user equipment (UE), an indication of a second set of beams, wherein the second set of beams is selected at least from the plurality of inactive beams based at least in part on the beam sweep; and communicate a second transmission on the second set of beams based at least in part on receiving the indication, wherein the second transmission is a retransmission of the first transmission.

\* \* \* \* \*